US010067633B2

(12) United States Patent
Kim et al.

(10) Patent No.: US 10,067,633 B2
(45) Date of Patent: Sep. 4, 2018

(54) IMAGE DISPLAY DEVICE AND METHOD OF OPERATING THE SAME

(71) Applicant: SAMSUNG ELECTRONICS CO., LTD., Suwon-si, Gyeonggi-do (KR)

(72) Inventors: Hyeong-o Kim, Samcheok-si (KR); Bo-sung Seo, Suwon-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 165 days.

(21) Appl. No.: 15/270,284

(22) Filed: Sep. 20, 2016

(65) Prior Publication Data

US 2017/0083204 A1 Mar. 23, 2017

(30) Foreign Application Priority Data

Sep. 22, 2015 (KR) .................. 10-2015-0133885

(51) Int. Cl.
*G06F 3/0481* (2013.01)
*G06F 3/033* (2013.01)
(Continued)

(52) U.S. Cl.
CPC .......... *G06F 3/04812* (2013.01); *G06F 3/033* (2013.01); *G06F 3/038* (2013.01);
(Continued)

(58) Field of Classification Search
CPC .............................. G06F 3/048–3/0489; G06F 2203/048–2203/04801
See application file for complete search history.

(56) References Cited

U.S. PATENT DOCUMENTS 5,850,212 A * 12/1998 Nishibori ............ G06F 3/04892
345/160
6,505,208 B1 * 1/2003 Kanevsky ................ G09B 7/02
(Continued)

FOREIGN PATENT DOCUMENTS

WO 2010/029870 3/2010

OTHER PUBLICATIONS

Search Report and Written Opinion dated Dec. 19, 2016 in counterpart International Patent Application No. PCT/KR2016/010404.
(Continued)

Primary Examiner — Gene W Lee
(74) Attorney, Agent, or Firm — Nixon & Vanderhye, P.C.

(57) ABSTRACT

An image display device includes a display configured to display a plurality of items and a cursor indicating a location of an input; input receiving circuitry configured to receive an input for moving the cursor; and a controller configured to control the cursor to move in accordance with the received input, to control items adjacent to the cursor to be set as candidate items if the cursor stops moving, and to control guidelines to be displayed on the candidate items, wherein in response to an input of a direction key while the focus is displayed on the first candidate item, and wherein the controller is further configured to control the focus to move to a second candidate item among the candidate items corresponding to the input of the direction key if the input of the direction key corresponds to a short press and to control the cursor to move in a direction corresponding to the input of the direction key if the input of the direction key corresponds to a long press.

20 Claims, 17 Drawing Sheets

(51) Int. Cl.
*G06F 3/038* (2013.01)
*G06F 3/0346* (2013.01)
*G06F 3/0484* (2013.01)
*G06F 3/0489* (2013.01)
*H04N 21/431* (2011.01)

(52) U.S. Cl.
CPC ........ *G06F 3/0346* (2013.01); *G06F 3/04842* (2013.01); *G06F 3/04892* (2013.01); *H04N 21/4312* (2013.01)

(56) References Cited

U.S. PATENT DOCUMENTS

| | | | |
|---|---|---|---|
| 6,947,062 | B2 | 9/2005 | Cuijpers et al. |
| 7,825,904 | B2 | 11/2010 | Hino |
| 8,665,207 | B2 | 3/2014 | Urashima et al. |
| 2002/0123368 | A1* | 9/2002 | Yamadera ......... H04M 1/72583 455/566 |
| 2009/0040357 | A1* | 2/2009 | Ichii .................. H04N 5/23245 348/333.02 |
| 2009/0064047 | A1* | 3/2009 | Shim .................... G06F 3/0482 715/835 |
| 2009/0119609 | A1* | 5/2009 | Matsumoto ......... G06F 3/04817 715/769 |
| 2010/0100849 | A1* | 4/2010 | Fram .................... G06F 3/0236 715/835 |
| 2010/0262933 | A1 | 10/2010 | Kim et al. |
| 2011/0109575 | A1 | 5/2011 | Lii et al. |
| 2011/0126147 | A1 | 5/2011 | Kim et al. |
| 2013/0070162 | A1 | 3/2013 | Maeda et al. |
| 2014/0351758 | A1 | 11/2014 | Yoshida |
| 2015/0172772 | A1 | 6/2015 | Kim |

OTHER PUBLICATIONS

Extended Search Report dated Jan. 25, 2018 in counterpart European Patent Application No. 16848869.0.

* cited by examiner

ND METHOD
IMAGE DISPLAY DEVICE AND METHOD OF OPERATING THE SAME

CROSS-REFERENCE TO RELATED APPLICATION

This application is based on and claims priority under 35 U.S.C. § 119 to Korean Patent Application No. 10-2015-0133885, filed on Sep. 22, 2015, in the Korean Intellectual Property Office, the disclosure of which is incorporated by reference herein in its entirety.

BACKGROUND

1. Field

The present disclosure relates generally to an image display device and a method of operating the image display device, and for example, to an image display device capable of efficiently moving a cursor and selecting an item by inputting through a direction key and a method of operating the image display device.

2. Description of Related Art

An image display device is a device having a function of displaying an image that is viewable by a user. A user may view broadcasting through an image display device. An image display device displays, on a display, broadcasting selected by a user from among broadcast signals transmitted by a broadcasting station. The current worldwide trend is to switch from analog broadcasting to digital broadcasting.

Digital broadcasting may refer, for example, to broadcasting that transmits digital images and audio signals. Compared to analog broadcasting, digital broadcasting is robust to external noise and thus has low data loss, is advantageous in terms of error correction, and provides high definition screens. Digital broadcasting enables bidirectional services, unlike analog broadcasting.

Recently, smart televisions have been supplied to provide a variety of contents to a digital broadcasting function. Smart televisions do not passively operate according to selections of users and aim to analyze and provide what users want without manipulation by users.

SUMMARY

An image display device and an image display method that move a cursor to a point adjacent to an item that is to be selected, stop moving the cursor, and move a focus between items adjacent to the cursor, thereby efficiently selecting the item are provided.

Additional aspects will be set forth in part in the description which follows and, in part, will be apparent from the description.

According to an aspect of an example embodiment, an image display device includes: a display configured to display a plurality of items and a cursor indicating a pointing position determined by a received input; input receiving circuitry configured to receive an input for moving the cursor; and a controller configured to control the cursor to move based on the received input, to determine items adjacent to the cursor as candidate items if the cursor stops moving, and to control to display a focus on a first candidate item among the candidate items and guidelines on the candidate items, wherein in response to an input of a direction key while the focus is displayed on the first candidate item, the controller is further configured to control the focus to move to a second candidate item among the candidate items corresponding to the input of the direction key if the input of the direction key is corresponding to a short press and to control the cursor move in a direction corresponding to the input of the direction key if the input of the direction key is corresponding to a long press.

The input for moving the cursor may be the long press of the direction key, and wherein the controller controls a moving speed of the cursor to be increased based on receiving the long press of the direction key.

The controller may set the candidate items based on a path in which the cursor moves.

The controller may control items adjacent to the cursor in a same direction as and in a different direction from a direction in which the cursor moves to be set as the candidate items.

The display may display the cursor on a candidate item on which the focus is located.

If the guidelines are displayed on the candidate items, the controller may control the focus to be located on a candidate item on which the cursor is located and controls the cursor to stop being displayed.

The controller may control the candidate item on which the focus is located to be highlighted.

A user input receiver may include various input circuitry configured to receive the input of the direction key while the focus is located on the second candidate item, and wherein the controller controls the guidelines to stop being displayed when there is no candidate item in the direction corresponding to the input of the direction key with respect to the second candidate item.

In response to the long press of the direction key, the controller may control the cursor to move in a direction corresponding to the pressed direction key, and in response to a key release following the long press of the direction key, the controller may stop the displaying the cursor and to display the focus and the guidelines.

The controller may control the guidelines to stop being displayed when the input of the direction key is not sensed for a predetermined time period while the guidelines are displayed on the candidate items.

The user input receiver may receive the user input for moving the cursor if the guidelines stop being displayed, and wherein the controller moves the cursor in accordance with the user input.

According to an aspect of another example embodiment, a method of operating an image display device includes displaying a plurality of items and a cursor indicating a pointing position determined by a received input on a display; receiving the input for moving the cursor; moving the cursor in accordance with the received input, determining items adjacent to the cursor as candidate items if the cursor stops moving, and displaying a focus on a first candidate item among the candidate items and guidelines on the candidate items; and in response to an input of a direction key while the focus is displayed on the first candidate item, moving the focus to a second candidate item among the candidate items in a direction corresponding to the input of the direction key if the input of the direction key is corresponding to a short press and moving the cursor in a direction corresponding to the input of the direction key if the input of the direction key is corresponding to a long press.

The input for moving the cursor may be the long press of the direction key, and if the long press of the direction key is received, a moving speed of the cursor is set to be increased.

The candidate items may be set based on a path in which the cursor moves.

The candidate items may include items adjacent to the cursor in a same direction as and in a different direction from a direction in which the cursor moves.

The method may further include: displaying the cursor on a candidate item on which the focus is located.

The method may further include: if the guidelines are displayed on the candidate items, locating the focus on a candidate item on which the cursor is located and not displaying the cursor.

The method may further include: highlighting the candidate item on which the focus is located.

The method may further include: sensing the input of the direction key while the focus is located on the second candidate item, and stopping display of the guidelines when there is no candidate item in the direction corresponding to the input of the direction key with respect to the second candidate item.

The method may further include: stopping display of the cursor and displaying the focus and the guidelines, in response to a key release following the long press of the direction key.

The method may further include: stopping display of the guidelines when the input of the direction key is not sensed for a predetermined time period while the guidelines are displayed on the candidate items.

The method may further include: receiving the input for moving the cursor if the guidelines stop being displayed, and moving the cursor in accordance with the received input.

BRIEF DESCRIPTION OF THE DRAWINGS

These and/or other aspects will become apparent and more readily appreciated from the following detailed description, taken in conjunction with the accompanying drawings, in which like reference numerals refer to like elements, and wherein.

DETAILED DESCRIPTION

Figure 1:
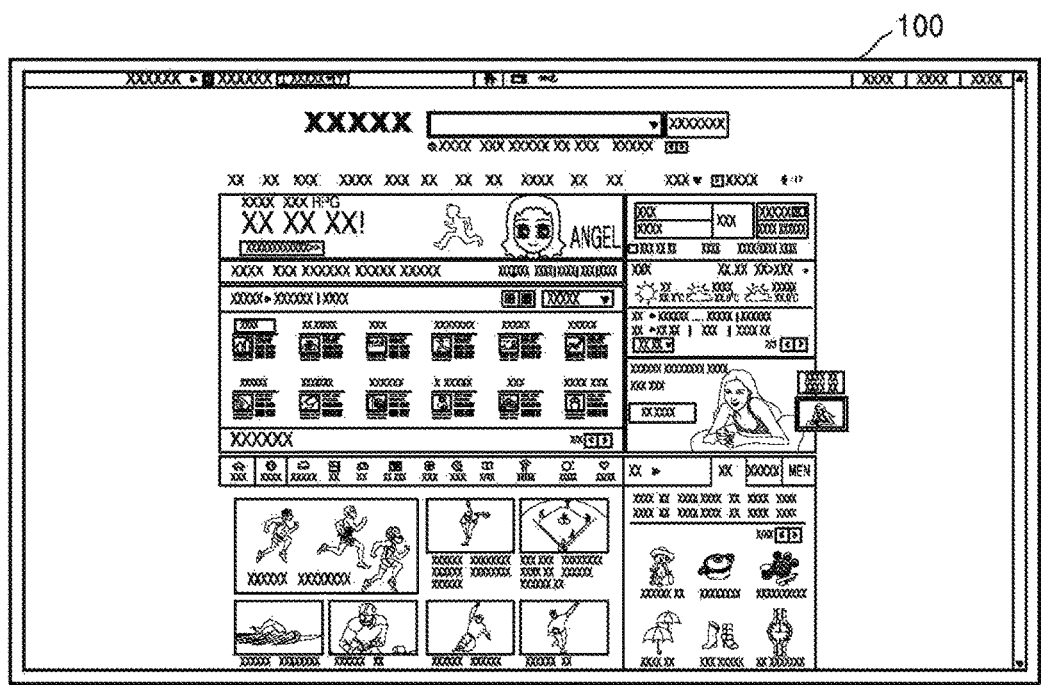
FIG. 1 is a diagram illustrating an example image display device and a control device according to an example embodiment.

Terms used in this description will be described in brief, and then embodiments of the present disclosure will be described in detail.

As terms used in this description, general terms currently in wide use are selected wherever possible in consideration of functions in the present disclosure, but may vary according to intentions of those of ordinary skill in the art, precedent cases, the advent of new technology, and so on. In particular, some terms may be arbitrarily selected, and in such cases, the detailed meanings of the terms will be stated in the corresponding description. Therefore, the terms used in this description should be defined based on the meanings of the terms together with the description throughout the description rather than their simple names.

Throughout the description, when a portion "includes" an element, unless otherwise described, another element may be further included, rather than the presence of other elements being excluded. Also, terms such as "portion," "module," etc. used herein indicate a unit for processing at least one function or operation, in which the unit and the block may be embodied as hardware including, for example, and without limitation, processing circuitry (e.g., a CPU), or software or may be embodied by a combination of hardware and software.

Reference will now be made in greater detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the example embodiments are merely described below, by referring to the figures, to explain aspects. In the accompanying drawings, portions irrelevant to a description of the embodiments are omitted for clarity. Throughout the description, like reference numerals refer to like elements. As used herein, the term "and/or" includes any and all combinations of one or more of the associated listed items. Expressions such as "at least one of," when preceding a list of elements, modify the entire list of elements and do not modify the individual elements of the list.

FIG. 1 is a diagram illustrating an example image display device 100 and a control device 200 according to an example embodiment.

As illustrated in FIG. 1, the image display device 100 may be a TV but this is merely an example embodiment. The image display device 100 may be implemented as an electronic device including a display. For example, the image display device 100 may be implemented as one of various electronic devices such as a smart phone, a tablet PC, a digital camera, a camcorder, a laptop computer, a desktop computer, an e-book terminal, a digital broadcasting terminal, a personal digital assistant (PDA), a portable multimedia player (PMP), a navigation device, an MP3 player, a wearable device, etc. In particular embodiments may be easily implemented in a display device having a large display such as a TV but are not limited thereto. Also, the image display device 100 may be a fixed or mobile type and may be a digital broadcasting receiver capable of receiving digital broadcasting.

The image display device 100 may be implemented not only as a flat display device but also as a curved display device which is a screen having a curvature or a flexible display device having an adjustable curvature. An output resolution of the image display device 100 may include, for example, high definition (HD) resolution, full HD resolution, ultra HD resolution, or a resolution higher than ultra HD resolution.

The control device 200 may be implemented as a device of various types for controlling the image display device 100 such as a remote controller or a cellular phone.

The control device 200 may control the image display device 100 based on short-range communication such as infrared or Bluetooth. The control device 200 may control a function of the image display device 100 by using at least one of provided keys (including buttons), a touchpad, a microphone (not shown) capable of receiving the voice of a user, and a sensor (not shown) capable of recognizing a motion of the control device 200.

The control device 200 may include a power ON/OFF button for turning the image display device 100 ON or OFF. The control device 200 may also change a channel of the image display device 100, adjust a volume of the image display device 100, select a terrestrial broadcast/cable broadcast/satellite broadcast, or perform configuration settings according to a user input.

The control device 200 may include four direction keys (or four direction buttons). The four direction keys may be used to direct upper, lower, left, and right movement. For example, when the control device 200 receives an input of any one of the four direction keys, the image display device 100 may move a cursor or a focus in the corresponding direction.

The control device 200 may be a pointing device. For example, the control device 200 may operate as the pointing device when the control device 200 receives an input of a specific key.

The image display device 100 may be controlled by a input of, for example, a user moving the control device 200 up, down, left, or right, or tilting the control device 200 in an arbitrary direction. Information regarding movement of the control device 200 that is sensed through a sensor of the control device 200 may be transmitted to the image display device 100. The image display device 100 may calculate coordinates of a cursor on the display from the information regarding the movement of the control device 200 and move the cursor in accordance with the calculated coordinates. Accordingly, the cursor on the display of the image display device 100 may move or various displayed menus may be activated.

Alternatively, when the control device 200 includes a touch pad, the cursor on the display of the image display device 100 may move or various displayed menus may be selectively activated according to a displacement value of an object such as a user's finger that moves on the touch pad.

The term "user" in an embodiment of the present description may refer, for example, to a person who controls a function or an operation of the image display device 100 by using the control device 200 and may include a viewer, a manager, or an installation engineer.

The image display device 100 according to an embodiment may display a plurality of items and a cursor indicating a location of a user input on the display.

The image display device 100 according to an embodiment may move a cursor in accordance with a user input, stop moving the cursor, and set items adjacent to the cursor as candidate items. The image display device 100 may display a guideline to the candidate items, receive an input of a direction key, and move a focus between the candidate items.

Figure 2:
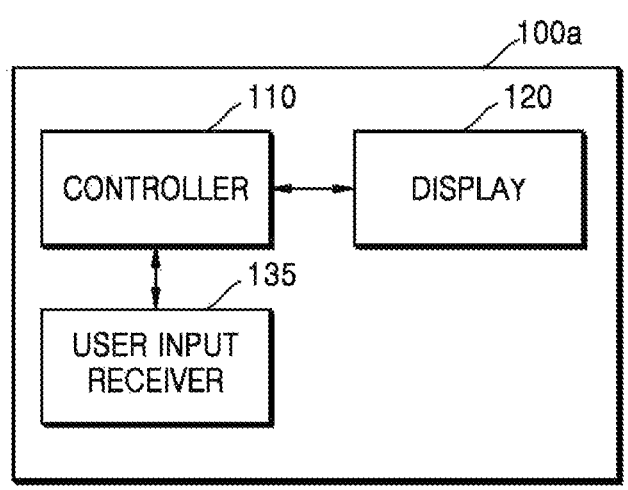
FIG. 2 is a block diagram illustrating an example configuration of an image display device according to an example embodiment.

FIG. 2 is a block diagram illustrating an example configuration of an image display device 100a according to an example embodiment. The image display device 100a of FIG. 2 may be an embodiment of the image display device 100 of FIG. 1.

Referring to FIG. 2, the image display device 100a according to an example embodiment may include a controller (e.g., including processing circuitry) 110, a display 120, and a user input receiver (e.g., including input receiving circuitry) 135.

The display 120 may generate a driving signal by converting an image signal, a data signal, an on-screen display (OSD) signal, a control signal, etc. processed by the controller 110. The display 120 may be implemented as a plasma display panel (PDP), a liquid crystal display (LCD), an organic light emitting diode (OLED) display, a flexible display, etc. and may also be implemented as a three-dimensional (3D) display. The display 120 may be configured as a touch screen and thus used as an input device as well as an output device.

The display 120 according to an embodiment may display a plurality of items. The display 120 may display a cursor indicating a position of a user input on the display 120.

The display 120 according to an embodiment may display a guideline on an item set as a candidate item and display the cursor on a candidate item in which a focus is positioned or highlight the candidate item in which the focus is positioned.

The display 120 may not display the cursor if the guideline is displayed on the candidate item. The display 120 may display the cursor again if displaying the guide line is finished.

The user input receiver 135 according to an embodiment may may include various input circuitry configured to receive the user input and send a sensed signal to the controller 110. The user input receiver 135 may include various circuitry configured to receive an input, such as, for example, and without limitation, a signal from the control device 200 representing a user input, such as a power on/off input, a channel selection input, a channel up/down input, or a screen setting input, from the control device 200. The user input receiver 135 according to an embodiment may receive a user input for moving the cursor displayed on the display 120 or an input of a direction key for moving the focus between the candidate items.

The controller 110 according to an embodiment may include circuitry configured to process an image signal and input the processed image signal to the display 120. Accordingly, an image corresponding to the image signal may be displayed on the display 120. The controller 110 may control the image display device 100a by a user command received through the user input receiver 135 or an internal program.

For example, according to an embodiment, the controller 110 may move the cursor displayed on the display 120 in accordance with the received user input. The controller 110 may control a moving speed of the cursor to be faster in accordance with an input of long pressing a direction key for moving the cursor.

The controller 110 may set candidate items based on a path via which the cursor moves. The controller 110 may set items adjacent to the cursor in the same direction as and an opposite direction to a direction in which the cursor moves as the candidate items.

If guidelines are displayed on the candidate items, the controller 110 may control the focus to be positioned on a candidate item where the cursor is positioned and the cursor not to be displayed on the display 120. The controller 110 may control the candidate item on which the focus is positioned to be highlighted.

The controller 110 may move the focus between the candidate items in accordance with an input of the direction key.

When the controller 110 does not sense the input of the direction key for a predetermined time period while the guidelines are displayed on the candidate items, the controller 110 may finish displaying the guidelines. When there is no candidate item in the candidate item on which the focus is positioned in a direction corresponding to the input of the direction key, the controller 110 may finish displaying the guidelines.

The controller 110 may move the cursor in accordance with an input for moving the cursor if the controller 110 finishes displaying the guidelines.

Figure 3:
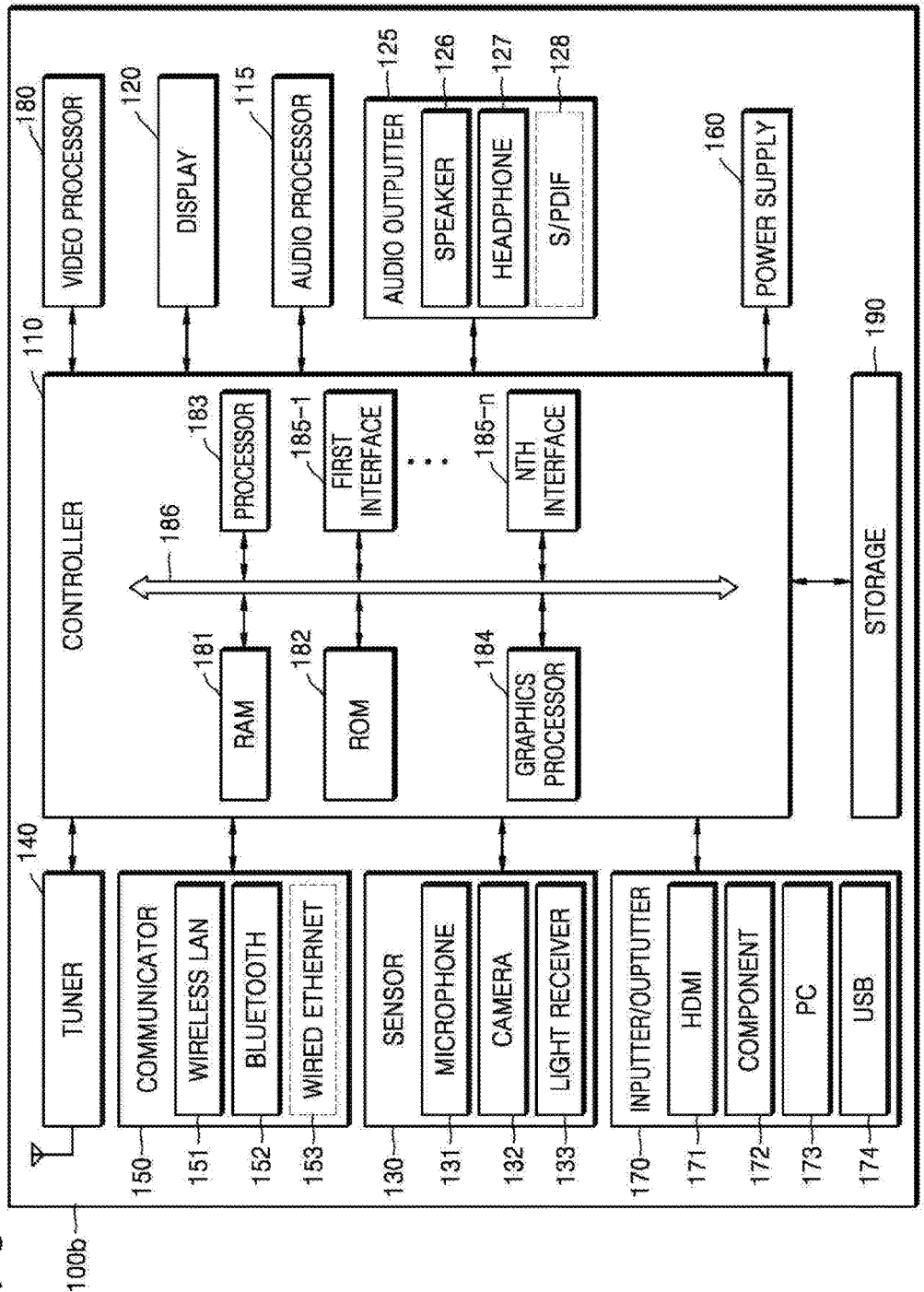
FIG. 3 is a block diagram illustrating an example configuration of an image display device according to an example embodiment.

FIG. 3 is a block diagram illustrating an example configuration of an image display device 100b according to an example embodiment. The image display device 100b of FIG. 3 may be an embodiment of the image display device 100 of FIG. 1.

Referring to FIG. 3, the image display device 100b according to an embodiment may further include a video processor 180, an audio processor 115, an audio outputter 125, a power supply 160, a tuner 140, a communicator (e.g., including communication circuitry) 150, an inputter/outputter (e.g., including input/output circuitry) 170, and a storage 190, in addition to the controller 110, the display 120, and the sensor 130. The sensor 130 of FIG. 3 may correspond to the user input receiver 135 of FIG. 2.

Regarding the controller 110, the display 120, and the sensor 130 of FIG. 3, the same description as provided with reference to FIG. 2 will be omitted.

The video processor 180 may process video data received by the image display device 100b. The video processor 180 may perform various image processing operations, such as decoding, scaling, noise filtering, frame rate conversion, and resolution conversion, on the video data.

The display 120 may display a video included in a broadcast signal received by the tuner 140 under control of the controller 110. The display 120 may display content (e.g., a video) that is input through the communicator 150 or the inputter/outputter 170. The display 120 may output an image stored in the storage 190 under control of the controller 110. The display 120 may display a voice user interface (UI) (e.g., including a voice command guide) for performing a voice recognition task corresponding to voice recognition or a motion UI (e.g., including a user motion guide for motion recognition) for performing a motion recognition task corresponding to motion recognition.

The audio processor 115 may process audio data. The audio processor 115 may perform various processing operations, such as decoding, amplification, and noise filtering, on the audio data. The audio processor 115 may include a plurality of audio processing modules to process audio corresponding to a plurality of pieces of content.

The audio outputter 125 may include various circuitry configured to output audio included in a broadcast signal received by the tuner 140 under control of the controller 110. The audio outputter 125 may output audio (e.g., a voice or sound) that is input through the communicator 150 or the inputter/outputter 170. The audio outputter 125 may output audio stored in the storage 190 under control of the controller 110. The audio outputter 125 may include at least one of a speaker 126, a headphone output terminal 127, and a Sony/Philips digital interface (S/PDIF) output terminal 128.

The audio outputter 125 may include a combination of the speaker 126, the headphone output terminal 127, and the S/PDIF output terminal 128.

The power supply 160 may supply power that is input from an external power source to internal elements of the image display device 100b under control of the controller 110. The power supply 160 may supply power that is output from one or more batteries (not shown) positioned inside the image display device 100b under control of the controller 110 to the internal elements.

The tuner 140 may tune and select only frequency of a channel to be received by the image display device 100 from among many frequency components by amplifying, mixing, and resonating a broadcasting signal received by wired or wirelessly. The broadcast signal may include audio, video, and additional information (e.g., an electronic program guide (EPG)).

The tuner 140 may receive a broadcast signal in a frequency band corresponding to a channel number (e.g., cable broadcasting No. 506) in accordance with a user input (e.g., a control signal received from the control device 200, for example, a channel number input, a channel up/down input, and a channel input on an EPG screen).

The tuner 140 may receive the broadcast signal from various sources, such as terrestrial broadcasting, cable broadcasting, satellite broadcasting, and Internet broadcasting. The tuner 140 may also receive a broadcast signal from a source such as analog broadcasting or digital broadcasting. The broadcast signal received by the tuner 140 may be decoded (e.g., audio decoding, video decoding, or additional information decoding) and separated into audio, video, and/or additional information. The separated audio, video, and/or additional information may be stored in the storage 190 under control of the controller 110.

The image display device 100b may include one tuner 140 or a plurality of tuners 140. The tuner 140 may be implemented as all-in-one with the image display device 100b or may implemented as a separate device (e.g., a set-top box; not shown) having a tuner electrically connected to the image display device 100b, or as a tuner (not shown) connected to the inputter/outputter 170.

The communicator 150 may include various communication circuitry configured to connect the image display device 100b with an external device (e.g., an audio device) under control of the controller 110. The controller 110 may transmit/receive content to/from the connected external device through the communicator 150, download an application from the external device, or perform web browsing. The communicator 150 may include various communication circuitry including, without limitation, one of a wireless LAN (WLAN) 151, Bluetooth 152, and wired Ethernet 153 in accordance with the performance and structure of the display device 100. The communicator 150 may include a combination of the various communications circuitry, such as, for example, WLAN 151, Bluetooth 152, and wired Ethernet 153. The communicator 150 may receive a control signal of the control device 200 under control of the controller 110. The control signal may be implemented as a Bluetooth type signal, an RF type signal, or a WiFi type signal.

The communicator 150 may further include short-range communication circuitry (e.g., near field communication (NFC) (not shown) and Bluetooth low energy (BLE) (not shown)) in addition to Bluetooth 152.

The sensor 130 may sense a voice, an image, or an interaction of a user.

A microphone 131 may receive a voice of a user. The microphone 131 may convert the received voice into an electrical signal and output the electrical signal to the controller 110. The voice of the user may include, for example, a voice corresponding to a menu or function of the image display device 100*b*. A recognition range of the microphone 131 may be recommended as a distance of 4 meters or less from the microphone 131 to a position of the user and may vary based on the volume of the voice of the user and surrounding environmental conditions (e.g., sound of a speaker and ambient noise).

According to an embodiment, the microphone 131 may receive the voice of the user and output received voice data to the controller 110 such that the controller 110 may use the voice data to identify an identity of the user who views the image display device 100*b*.

The microphone 131 may be implemented as all-in-one with or separately from the image display device 100*b*. The separated microphone 131 may be electrically connected with the image display device 100*b* through the communicator 150 or inputter/outputter 170.

It will be easily understood by one of ordinary skilled in the art that the microphone 131 may be excluded according to the performance and structure of the image display device 100*b*.

A camera 132 may receive an image (e.g., consecutive frames) corresponding to a motion of the user including a gesture within a camera recognition range. For example, a recognition range of the camera 132 may be a distance from about 0.1 meters to about 5 meters from the camera 132 to the user. The motion of the user may include, for example, a part of a user's body such as a user's face, a facial expression of the user, a user's hand, and a user's finger or a part of motion of the user. The camera 132 may convert the received image into an electrical signal and output the electrical signal to the controller 110 under control of the controller 110.

According to an embodiment, the camera 132 may capture the user's face, etc. and output an image of the captured face to the controller 110 such that the controller 110 may use the image to identify an identity of the user who views the image display device 100*b*.

The controller 110 may use a received motion recognition result to select a menu displayed on the image display device 100*b* or perform control corresponding to the motion recognition result. For example, the control may include channel adjustment, volume adjustment, indicator movement, and cursor movement.

The camera 132 may include a lens (not shown) and an image sensor (not shown). The camera 132 may use a plurality of lenses and image processing to support optical zoom or digital zoom. The recognition range of the camera 132 may be variously set based on an angle of the camera 132 and surrounding environmental conditions. When the camera 132 includes a plurality of cameras, the plurality of cameras may be used to receive a three-dimensional (3D) still image or 3D motion.

The camera 132 may be implemented as all-in-one with or separately from the image display device 100*b*. A separate device (not shown) including the separated camera 132 may be electrically connected with the image display device 100*b* through the communicator 150 or the inputter/outputter 170.

It will be easily understood by one of ordinary skilled in the art that the camera 132 may be excluded according to the performance and structure of the image display device 100*b*.

A light receiver 133 may receive an optical signal (including a control signal) from the external control device 200 through an optical window (not shown) of a bezel of the display 120. The light receiver 133 may receive an optical signal corresponding to a user input (e.g., a touch, a press, a touch gesture, a voice, or a motion) from the control device 200. The control signal may be extracted from the received optical signal under control of the controller 110.

The inputter/outputter 170 may receive a video (e.g., a moving picture), audio (e.g., a voice or music, etc.), and additional information (e.g., an EPG, etc.) from the outside of the image display device 100*b* under control of the controller 110. The inputter/outputter 170 may include various input/output circuitry, such as, for example, and without limitation, one of a high-definition multimedia interface (HDMI) port 171, a component jack 172, a PC port 173, and a USB port 174. The inputter/outputter 170 may include a combination of the HDMI port 171, the component jack 172, the PC port 173, and the USB port 174.

It will be easily understood by one of ordinary skilled in the art that the configuration and operation of the inputter/outputter 170 may be implemented in various ways according to an embodiment of the present disclosure.

The controller 110 may control an overall operation of the image display device 100*b* and signal flow between the internal elements of the image display device 100*b* and to process data. When there is a user's input or a present and stored condition is satisfied, the controller 110 may execute an operating system (OS) and various applications that are stored in the storage 190.

The controller 110 may include random access memory (RAM) 181 that stores a signal or data received from the outside of the image display device 100*b* or is used as a storage region corresponding to various tasks performed by the image display device 100*b*, read only memory (ROM) 182 that stores a control program for controlling the image display device 100*b*, and a processor 183.

The processor 183 may include a graphics processing unit (GPU) (not shown) for performing graphics processing corresponding to a video. The processor 183 may be implemented as a system-on-chip (SoC) in which a core (not shown) and the GPU (not shown) are integrated. The processor 183 may include a single core, a dual core, a triple core, a quad core, or multiple cores.

The processor 183 may include a plurality of processors. For example, the processor 183 may be implemented as a main processor (not shown) and a sub processor (not shown) that operates in a sleep mode.

A graphics processor 184 may use a calculator (not shown) and a renderer (not shown) to generate a screen including various objects such as an icon, image, text, or the like. The calculator may use the user input sensed through the sensor 130 to calculate attribute values, such as coordinates, forms, sizes, and colors with which respective objects are to be displayed according to a layout of the screen. The renderer may generate a screen of various layouts including the objects on the basis of the attribute values calculated by the calculator. The screen generated by the renderer may be displayed within a display region of the display 120.

First to nth interfaces 185-1 to 185-*n* may be connected with the above-described various elements. One of the first to nth interfaces 185-1 to 185-*n* may be a network interface connected with an external device through a network.

The RAM 181, the ROM 182, the processor 183, the graphics processor 184, and the first to nth interfaces 185-1 to 185-*n* may be connected to each other through an internal bus 186.

The term "a controller of an image display device" in the present embodiment includes the processor 183, the ROM 182, and the RAM 181.

The storage 190 may store various types of data, programs, or applications for driving and controlling the image display device 100b under control of the controller 110. The storage 190 may store input/output signals or data corresponding to the driving of the video processor 180, the display 120, the audio processor 115, the audio outputter 125, the power supply 160, the tuner 140, the communicator 150, the sensor 130, and the inputter/outputter 170. The storage 190 may store control programs for controlling the image display device 100b and the controller 110, an application initially provided by a manufacturer or downloaded from the outside, a graphical user interface (GUI) associated with the application, an object (e.g., an image text, an icon, a button, etc.) for providing the GUI, user information, documents, databases, or relevant data.

In an embodiment, the term "storage" includes the storage 190, the ROM 182, or RAM 181 of the controller 110, or a memory card (e.g., a micro SD card or USB memory) (not shown) mounted in the image display device 100b. The storage 190 may include a nonvolatile memory, a volatile memory, a hard disk drive (HDD), and a solid state drive (SSD).

The storage 190 may include a broadcast receiving module, a channel control module, a volume control module, a communication control module, a voice recognition module, a motion recognition module, a light receiving module, a display control module, an audio control module, an external input control module, a power control module, a power control module of an external device that is wirelessly connected (e.g., via Bluetooth), a voice database (DB), or a motion DB. The modules and DBs, which are not shown, of the storage 190 may be implemented in the form of software for the image display device 100b to perform a broadcast reception control function, a channel control function, a volume control function, a communication control function, a voice recognition function, a motion recognition function, a light reception control function, a display control function, an audio control function, an external input control function, a power control function, or a power control function of an external device wirelessly connected (e.g., via Bluetooth) thereto. The controller 110 may perform each function using the software stored in the storage 190.

The image display device 100b having the display 120 may be electrically connected with a separate external device (e.g., a set-top box) (not shown) having a tuner. For example, it will be easily understood by one of ordinary skilled in the art that the image display device 100b may be implemented as an analog TV, a digital TV, a 3D TV, a smart TV, an LED TV, an OLED TV, a plasma TV, or a monitor, but is not limited thereto.

The image display device 100b may include a sensor (e.g., an illumination sensor, a temperature sensor, etc.) (not shown) that detects an internal or external state of the image display device 100b.

The block diagrams of the image display devices 100a and 100b illustrated in FIGS. 2 and 3 are block diagrams of an example embodiment. The elements illustrated in the block diagrams may be integrated with each other, some of the elements may be omitted, or other elements may be added according to a specification of the image display device 100. In other words, as occasion demands, two or more elements may be integrated as a single element or a single element may be divided into two or more elements. Functions performed by respective blocks are merely for describing embodiments, and their specific operations and devices do not limit the scope of the present disclosure.

Figure 4:
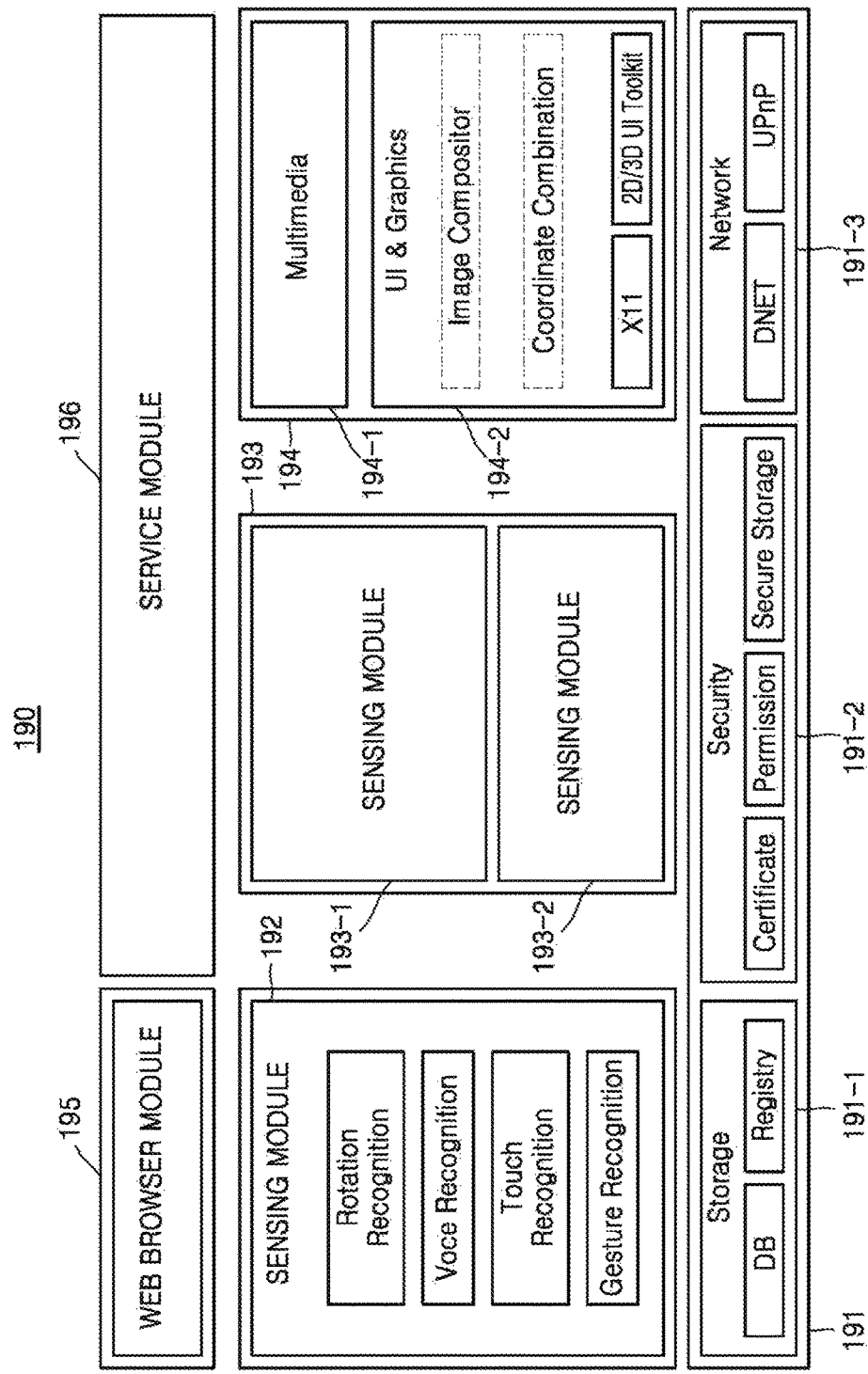
FIG. 4 is a diagram illustrating an example configuration of software stored in a storage of FIG. 3.

FIG. 4 is a diagram illustrating an example configuration of software stored in the storage 190 of FIG. 3.

Referring to FIG. 4, the software including a base module 191, a sensing module 192, a communication module 193, a presentation module 194, a web browser module 195, and a service module 196 may be stored in the storage 190.

The base module 191 may refer, for example, to a basic module that processes a signal transferred from each hardware unit included in the image display device 100 and transfers the processed signal to an upper layer module. The base module 191 may include a storage module 191-1, a security module 191-2, and a network module 191-3. The storage module 191-1 may be a program module that manages databases (DBs) or registries. The processor 183 may use the storage module 191-1 to access a database in the storage 190 and read various types of data. The security module 191-2 may be a program module that supports certification, request permission, and secure storage with respect to the hardware. The network module 191-3 may be a module for supporting network connection and may include a DNET module, a UPnP module, etc.

The sensing module 192 may refer, for example, to a module that collects information from various types of sensors and analyzes and manages the collected information. The sensing module 192 may include a head direction recognition module, a face recognition module, a voice recognition module, a motion recognition module, an NFC recognition module, and so on.

The communication module 193 may refer, for example, to a module for performing communication with the outside. The communication module 193 may include a messaging module 193-1 such as a messenger program, a short message service (SMS) & multimedia message service (MMS) program, or an email program and a telephony module 193-2 including a call information aggregator program module, a voice over Internet protocol (VoIP) module, etc.

The presentation module 194 may refer, for example, to a module for configuring a display screen. The presentation module 194 may include a multimedia module 194-1 for reproducing and outputting multimedia content and a UI rendering module 194-2 for performing user interfacing and graphic processing. The multimedia module 194-1 may include a player module, a camcorder module, a sound processing module, etc. Accordingly, the multimedia module 194-1 may perform an operation of reproducing various types of multimedia content to generate and reproduce a screen and a sound. The UI rendering module 194-2 may include an image compositor module that combines images, a coordinate combination module that combines and generates coordinates of images to be displayed on the screen, an X11 module that receives various types of events from the hardware, and a 2D/3D UI toolkit that provides a tool for configuring a 2D or 3D type UI.

The web browser module 195 may refer, for example, to a module that performs web browsing to access a web server. The web browser module 195 may include various modules such as a web view module that configures a web page, a download agent module that performs downloading, a bookmark module, a webkit module, etc.

The service module 196 may refer, for example, to a module including various types of applications for providing various services. In detail, the service module 196 may include various program modules such as an SNS program, a content reproduction program, a game program, an e-book program, a calendar program, an alarm management program, and other widgets.

Although various program modules are illustrated in FIG. 4, some of the various program modules illustrated in FIG. 4 may be omitted or modified or additional program modules may be added, according to types and characteristics of the image display device 100. For example, a location-based module that provides a location-based service in conjunction with a hardware module, such as a GPS chip, may be further included.

Figure 5:
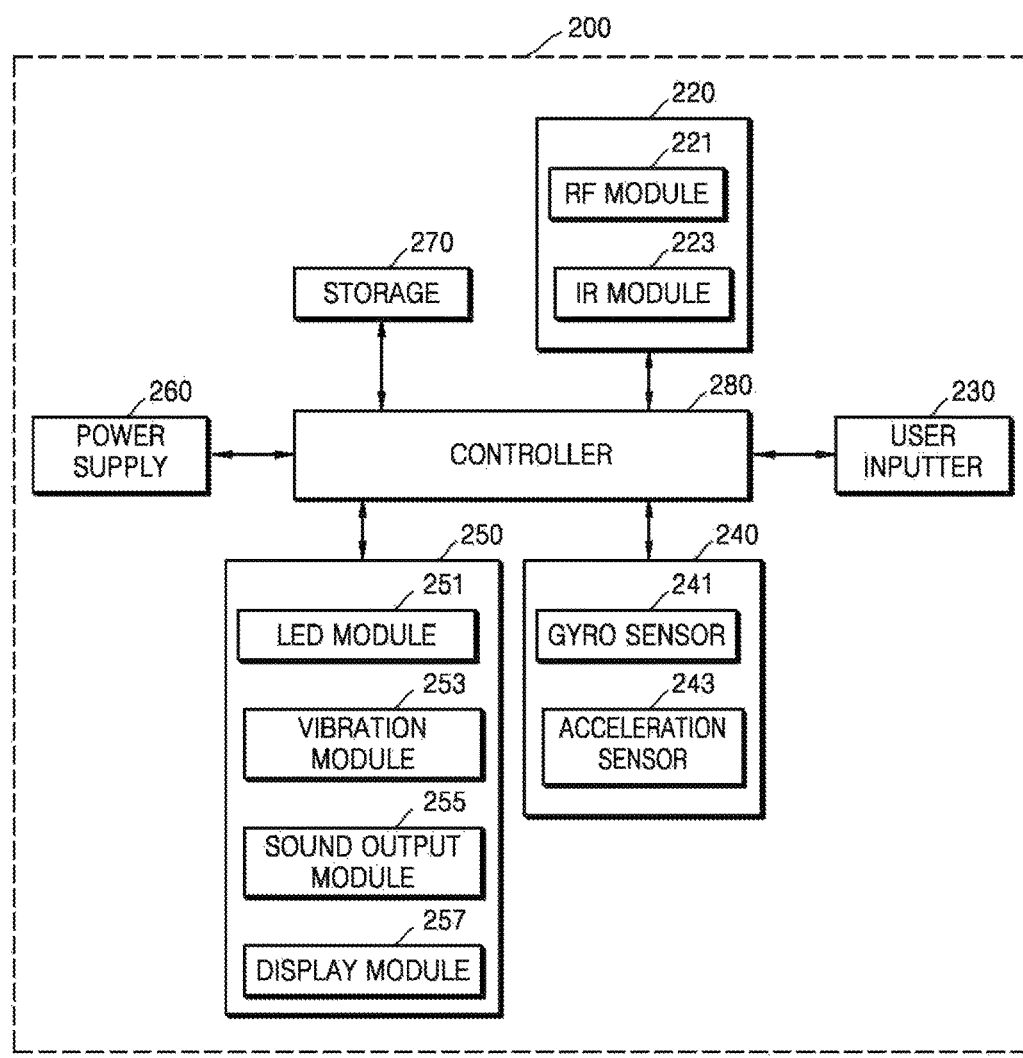
FIG. 5 is a block diagram illustrating an example configuration of a control device according to an example embodiment.

FIG. 5 is a block diagram illustrating an example configuration of the control device 200 according to an example embodiment.

Referring to FIG. 5, the control device 200 may include a wireless communicator (e.g., including communication circuitry) 220, a user inputter (e.g., including input circuitry) 230, a sensor 240, an outputter (e.g., including output circuitry) 250, a power supply 260, a storage 270, and a controller (e.g., including processing circuitry) 280.

The wireless communicator 220 may include various circuitry configured to transmit and receive signals to and from any one of the above-described image display devices according to embodiments. The wireless communicator 220 may include various communication circuitry, such as, for example, and without limitation, an RF module 221 that may transmit and receive signals to and from the image display device 100 according to an RF communication standard. The control device 200 may include an IR module 223 that may transmit and receive signals to and from the image display device 100 according to an IR communication standard.

In the present embodiment, the control device 200 may transmit a signal including information regarding a movement of the control device 200 to the image display device 100 through the RF module 221.

The control device 200 may receive a signal transmitted by the image display device 100 through the RF module 221. The control device 200 may transmit a command for power on/off, channel change, volume adjustment, etc. to the image display device 100 through the IR module 223 as necessary.

The user inputter 230 may include various input circuitry, such as, for example, and without limitation, a keypad, a button, a touch pad, or a touch screen, etc. A user may manipulate the user inputter 230 to input a command associated with the image display device 100 to the control device 200. When the user inputter 230 includes a hard key button, the user may input a command associated with the image display device 100 to the control device 200 through an operation of pushing the hard key button. When the user inputter 230 includes a touch screen, the user may touch a soft key of the touch screen to input a command associated with the image display device 100 to the control device 200.

For example, the user inputter 230 may include four direction buttons or keys. The four direction buttons or keys may be used to control a window, a region, an application, or an item that is displayed on the display 120. The four direction keys or buttons may be used to indicate up, down, left, and right movements. It will be understood by one of ordinary skilled in the art that the user inputter 230 may include two direction keys or buttons, instead of the four direction keys or buttons.

The user inputter 230 may include various types of input circuitry, such as a scroll key or a jog key, which may be manipulated by the user.

The user inputter 230 may include a touch pad. The user inputter 230 according to an embodiment may receive a user input such as a drag, touch, or flip through the touch pad of the control device 200. The image display device 100 may be controlled according to a type of the received user input (e.g., a direction in which a drag command is input, or a time at which a touch command is input).

The sensor 240 may include a gyro sensor 241 or an acceleration sensor 243. The gyro sensor 241 may sense information regarding a movement of the control device 200. For example, the gyro sensor 241 may sense information regarding an operation of the control device 200 with respect to x, y, and z axes. The acceleration sensor 243 may sense information regarding a moving speed of the control device 200. The sensor 240 may further include a distance measuring sensor and thus may sense a distance from the image display device 100.

The outputter 250 may include various circuitry configured to output a video or voice signal corresponding to manipulation of the user inputter 230 or corresponding to a signal received from the image display device 100. Through the outputter 250, the user may recognize whether to manipulate the user inputter 230 or whether to control the image display device 100.

For example, the outputter 250 may include various output circuitry, such as, for example, and without limitation, an LED module 251 that emits light, a vibration module 253 that vibrates, a sound output module 255 that outputs a sound, or a display module 257 that outputs an image if the user input unit 230 is manipulated or a signal is transmitted to and received from the image display device 100 via the wireless communicator 220.

The power supply 260 may supply power to the control device 200. When the control device 200 does not move for a time period, the power supply 260 may stop supplying power, thus reducing power consumption. The power supply 260 may resume supplying power when a predetermined key included in the control device 200 is manipulated.

The storage 270 may store various types of programs and application data necessary for control or operation of the control device 200.

The controller 280 may control an overall operation associated with the control of the control device 200. The controller 280 may transmit a signal corresponding to manipulation of a predetermined key of the user inputter 230 or a signal corresponding to a movement of the control device 200 sensed by the sensor 240 to the image display device 100 through the wireless communicator 220.

The image display device 100 may include a coordinate value calculator (not shown) that may calculate a coordinate value of a cursor corresponding to the operation of the control device 200.

The coordinate value calculator (not shown) may correct a hand shake or an error from a signal corresponding to a sensed operation of the control device 200 to calculate the coordinate value (x, y) of the cursor to be displayed on the display 120.

A transmission signal of the control device 200 sensed through the sensor 130 may be transmitted to the controller 110 of the image display device 100. The controller 110 may determine information regarding the operation and key manipulation of the control device 200 on the basis of the signal transmitted by the control device 200 and may control the image display device 100 in accordance with the determination.

As another example, the control device 200 may calculate a coordinate value of the cursor corresponding to the operation and transmit the calculated coordinate value to the image display device 100. In this case, the image display device 100 may transmit information regarding the received coordinate value of the cursor to the controller 110 without performing a separate process of correcting a hand shake or an error.

Figure 6A:
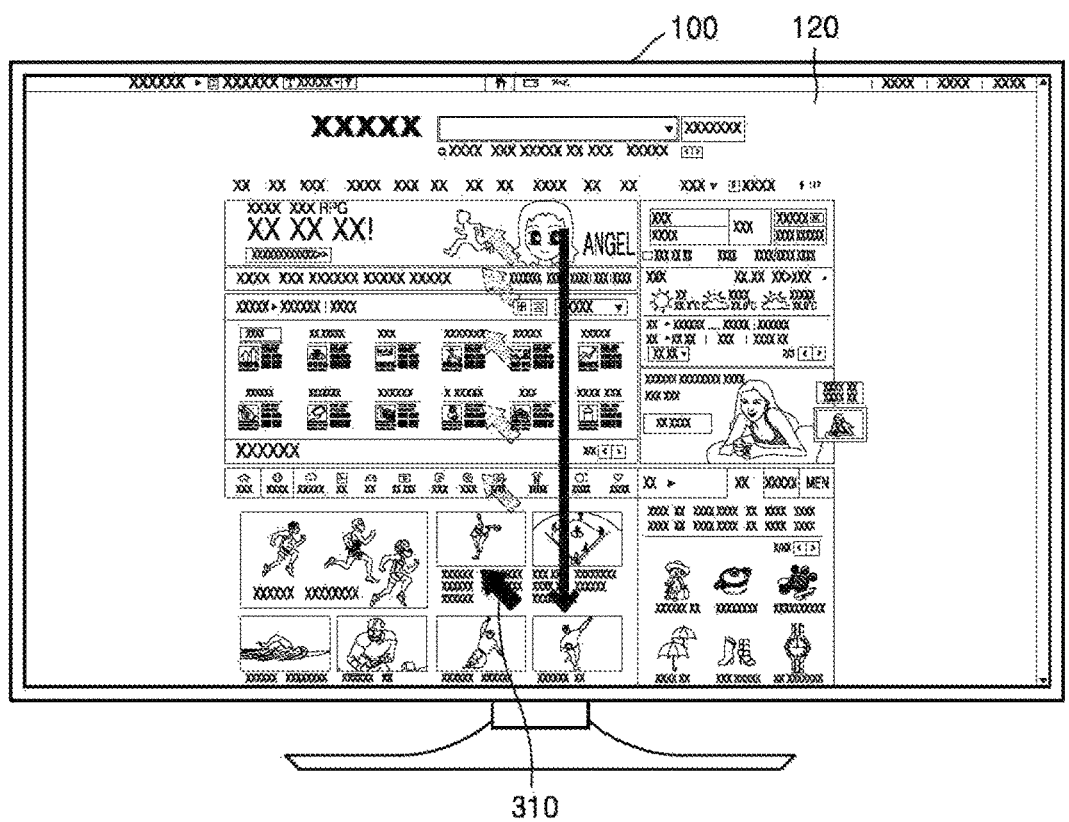
FIGS. 6A, 6B and 6C are diagrams illustrating examples in which candidate items are set and displayed on a display according to an example embodiment.
Figure 6A:
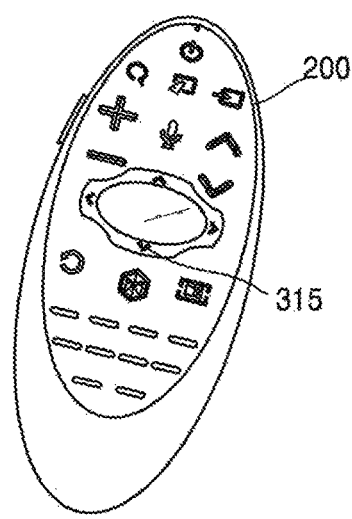
Figure 6B:
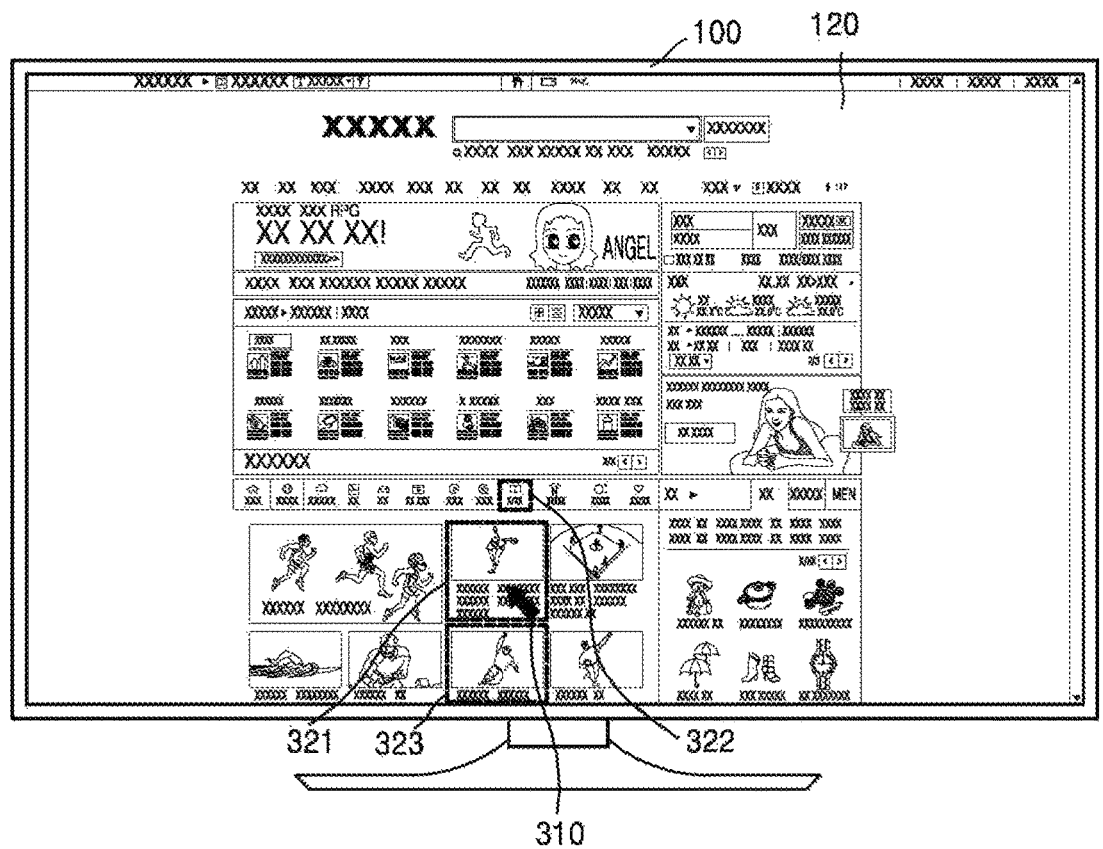
Figure 6C:
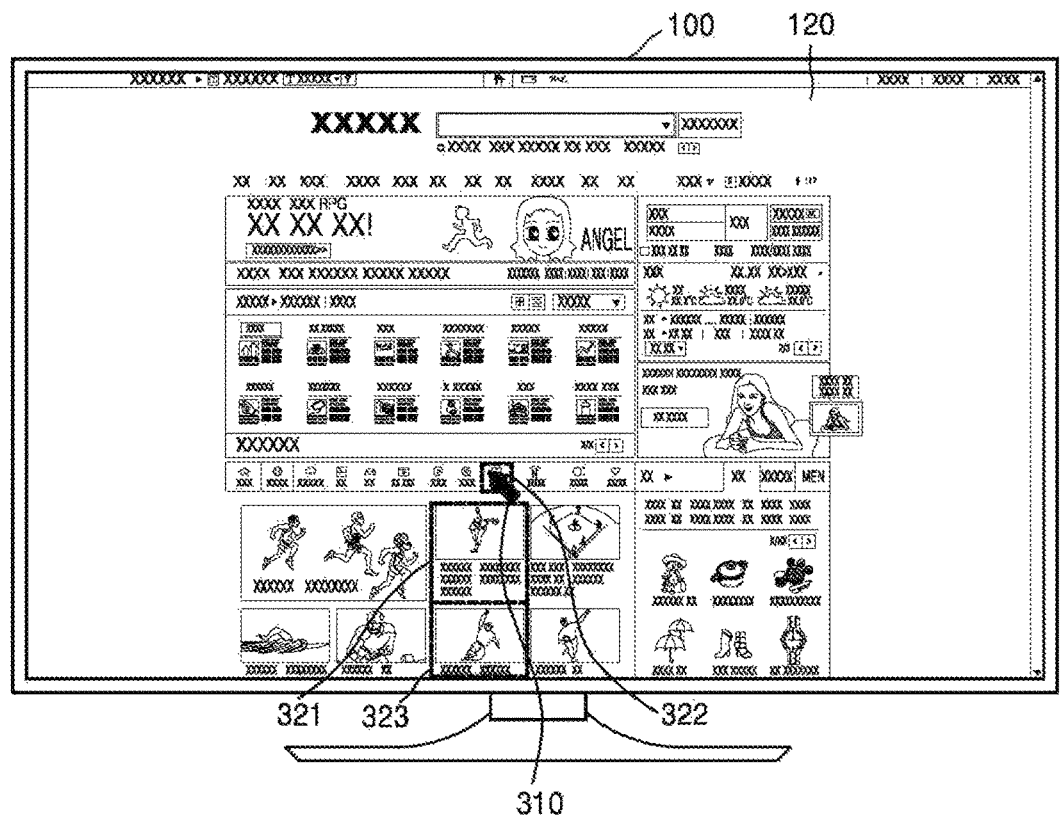
Figure 6C:
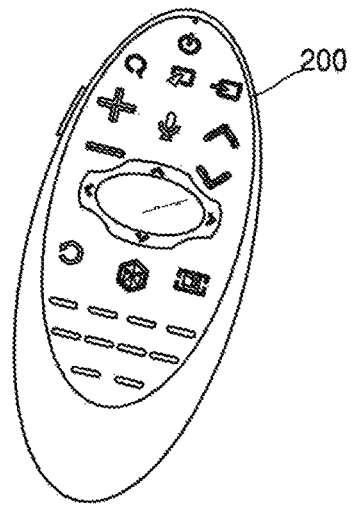

FIGS. 6A, 6B and 6C are diagrams illustrating examples in which candidate items are set and displayed on a display according to an embodiment.

Referring to FIG. 6A, the display 120 may display a plurality of items. For example, the display 120 may display a web page or a menu screen including the plurality of items, etc. but is not limited thereto.

The plurality of items displayed on the display 120 may include an item indicating content. The item indicating content may include an item indicating image content such as a movie or a soap opera, an item indicating audio content such as music, an item indicating an application, an item indicating a broadcasting channel, etc.

The plurality of items may be displayed as text or images. For example, when an item indicates content regarding a movie or a soap opera, the item may be displayed as a movie or soap opera poster image or a movie or soap opera title. When an item indicates audio content such as music, the item may be displayed as a poster image of an album including music or a movie or album title. When an item indicates an application, the item may be displayed as an image indicating the application or a name of the application.

Referring to FIG. 6A, the display 120 may display a cursor 310 indicating a location of a user input. The cursor 310 may move on the display 120 in accordance with a sensed input.

The cursor 310 is illustrated as having an arrow shape in FIG. 6A but is not limited thereto. The cursor 310 may have various shapes and sizes. A shape and a size of the cursor 310 may be set in various ways based on a user input.

The cursor 310 may be located in any one of the plurality of items displayed on the display 120. A user may move the cursor 310 to an item to be selected by using the control device 200.

When the image display device 100 according to an embodiment receives an input of one of four direction keys included in the control device 200, the image display device 100 may move the cursor 310 in a direction corresponding to the received direction key input.

For example, when the image display device 100 receives an input of a down direction key 315 (an input of pressing the down direction key 315), the image display device 100 may move the cursor 310 displayed on the display 120 in a down direction as illustrated in FIG. 6A.

Although not shown, the image display device 100 may move the cursor 310 in an up direction in accordance with an input of pressing an up direction key, in a right direction in accordance with an input of pressing a right direction key, and in a left direction in accordance with an input of pressing a left direction key. However, the present disclosure is not limited thereto.

In this regard, when the image display device 100 receives an input of long pressing a direction key, the image display device 100 may control a moving speed of the cursor 310 to be faster. For example, as illustrated in FIG. 6A, the longer the down direction key 315 is pressed, the faster the moving speed of the cursor 310.

Alternatively, when the image display device 100 repeatedly receives an input of a direction key of the same direction, the image display device 100 may control a movement distance of the cursor 310 per one input of the direction key to increase. For example, broken line arrows of FIG. 6A may indicate movement locations of the cursor 310 per one input of the down direction key 315. In this regard, distances between the arrows may increase in a down direction.

Meanwhile, referring to FIG. 6B, if the cursor 310 stops moving, the image display device 100 according to an embodiment may set items adjacent to the cursor 310 as candidate items. In this regard, when the image display device 100 does not receive a direction key input of the control device 200, the image display device 100 may determine that the cursor 310 stops moving.

The image display device 100 may set items located in a certain region with respect to a point at which the cursor 310 stops moving as candidate items. In this regard, the certain region may be a circular region having the point at which the cursor 310 stops moving as a center and a radius of a predetermined length. However, the present disclosure is not limited thereto. The certain region may be an oval region, a rectangular region, a triangular region, etc.

Alternatively, when the image display device 100 may set candidate items based on a direction in which the cursor 310 moves. For example, the image display device 100 may set items located in the same direction as in an opposite direction to the direction in which the cursor 310 moves among items adjacent to the cursor 310 as candidate items.

As illustrated in FIG. 6B, the image display device 100 may set, as candidate items, a candidate item 321 where the cursor 310 is located, a candidate item 323 located in the same direction (for example, a down direction) as a direction in which the cursor 310 moves, and a candidate item 322 located in an opposite direction (for example, an up direction) to the direction in which the cursor 310 moves with respect to a point at which the cursor 310 stops moving among items adjacent to the cursor 310.

The image display device 100 may display guidelines on the candidate items 321, 322, and 323. For example, as illustrated in FIG. 6B, the image display device 100 may display guidelines on an edge of each of the candidate items 321, 322, and 323 in accordance with a shape of each of the candidate items 321, 322, and 323.

If the candidate items 321, 322, and 323 are set according to an embodiment, a focus may be located on any one of the candidate items 321, 322, and 323. For example, as illustrated in FIG. 6B, the focus may be located on the first candidate item 321 located at the point where the cursor 310 stops moving. The cursor 310 may be continuously displayed after the candidate items are set. The cursor may be displayed on the first candidate item 321 on which the focus is located among the candidate items.

In this regard, the image display device 100 may sense an input of a direction key for moving the focus. For example, if an input of an up direction key 325 is received, as illustrated in FIG. 6C, the image display device 100 may move the focus located in the first candidate item 321 to the second candidate item 322 that is most adjacent to the first candidate item 321 in an up direction. In this regard, the cursor 310 displayed on the first candidate item 321 may be displayed on the second candidate item 322.

While the cursor 310 is located in any one candidate item of a plurality of candidate items, when a user input of selecting the candidate item is received, an operation corresponding to the candidate item may be performed. For example, when the candidate item indicates a movie poster, if the candidate item is selected by placing the cursor 310 thereon, detailed content of the movie may be displayed on the display 120. Alternatively, when the candidate item indicates a title of a news article, if the candidate item is selected by placing the cursor 310 thereon, content of the news article may be displayed on the display 120. However, the present disclosure is not limited thereto.

Figure 7A:
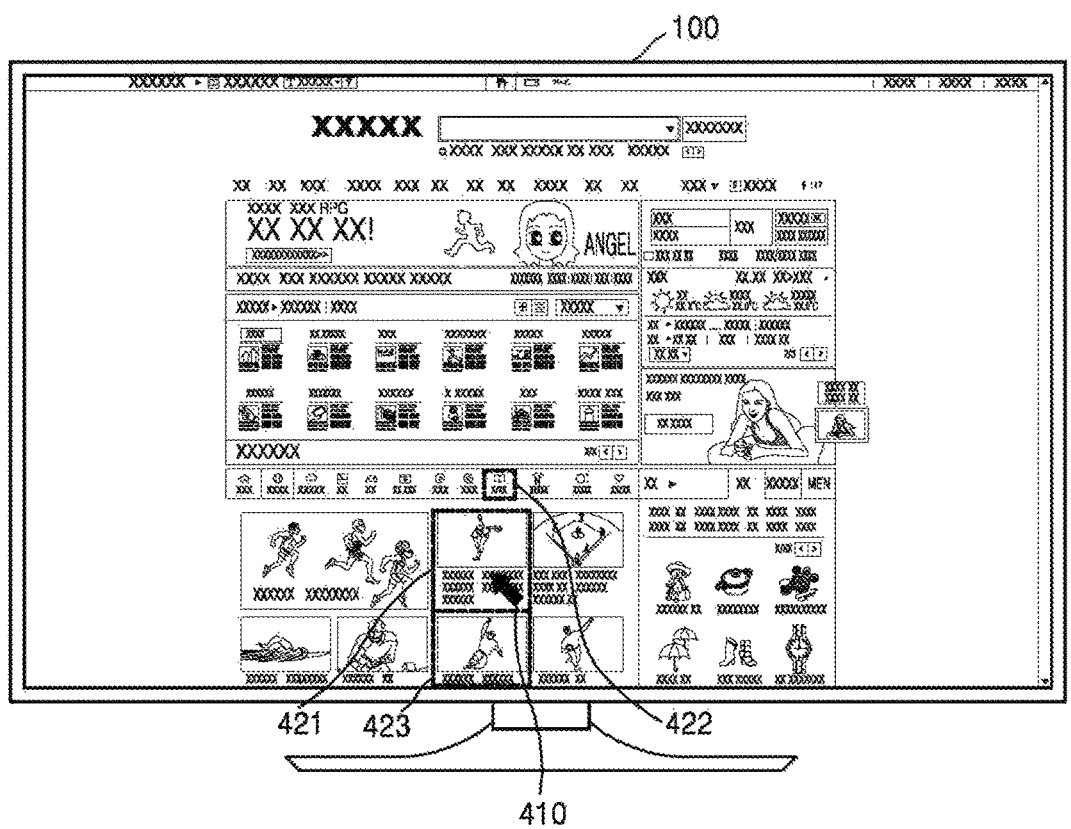
FIGS. 7A and 7B are diagrams illustrating an example method of disabling setting of candidate items, according to an example embodiment.
Figure 7A:
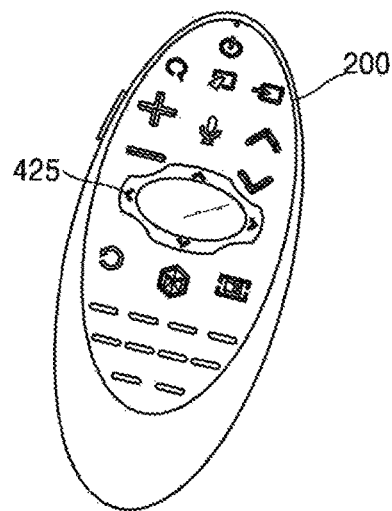
Figure 7B:
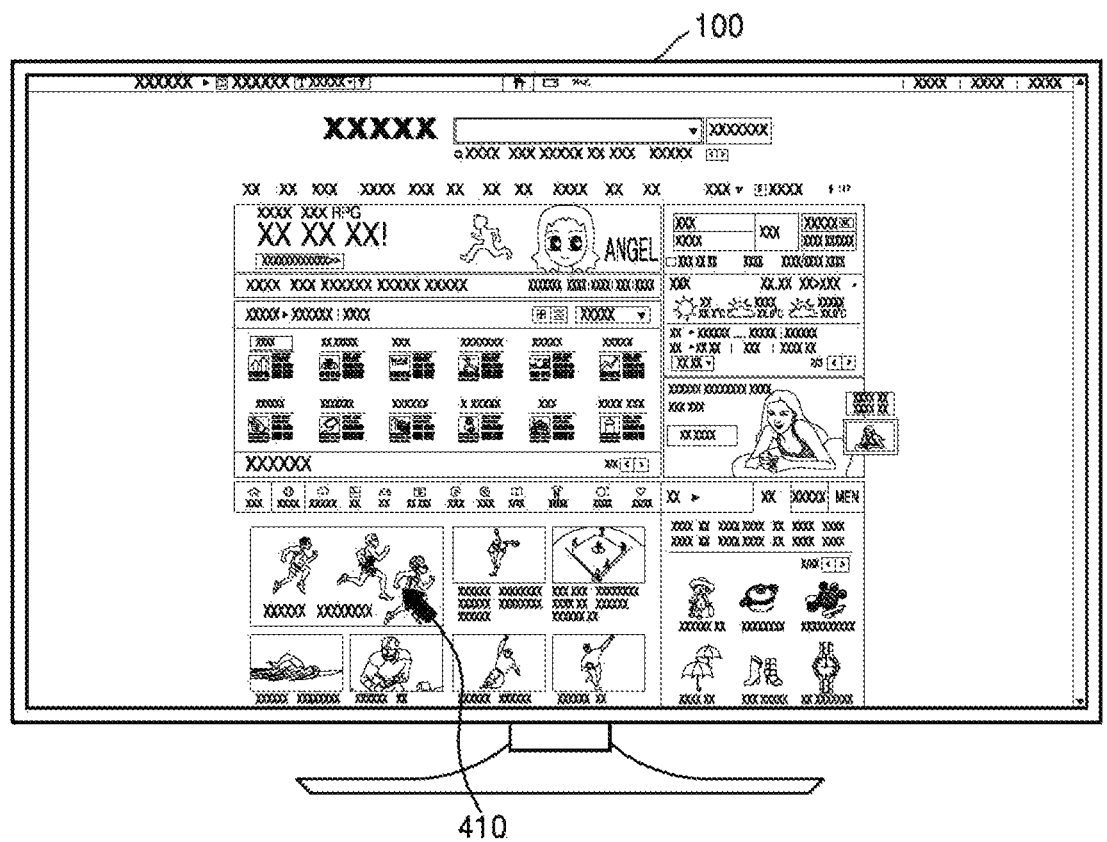
Figure 7B:
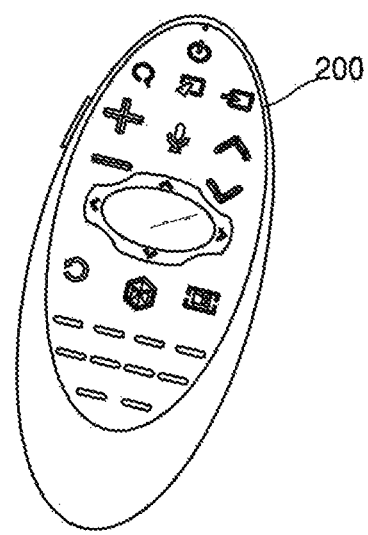

FIGS. 7A and 7B are diagrams illustrating an example method of disabling setting of candidate items, according to an example embodiment.

Referring to FIG. 7A, the image display device 100 according to an embodiment may set items adjacent to a cursor 410 as candidate items 421, 422, and 423 if the cursor 410 stops moving. The image display device 100 may display guidelines on edges of the candidate items 421, 422, and 423.

The image display device 100 according to an embodiment may sense an input of a direction key for moving a focus while the focus is located on the first candidate item 421 among the candidate items 421, 422, and 423. In this regard, when there is no candidate item in a direction corresponding to the input of the direction key, the image display device 100 may disable setting a candidate item.

For example, when an input of a left direction key 425 is sensed while the focus is located on the first candidate item 421, since there is no candidate item in a left direction of the first candidate item 421, as illustrated in FIG. 7B, the image display device 100 may disable setting a candidate item.

Although not shown, while guidelines are displayed on the candidate items 421, 422, and 423, when no input of the direction key is sensed for a predetermined time period, the image display device 100 may disable setting a candidate item.

If the image display device 100 disables setting a candidate item, the image display device 100 may stop displaying the guidelines on edges of the candidate items 421, 422, and 423. If the image display device 100 disables setting a candidate item, the image display device 100 may sense a user input for moving the cursor 410 and move the cursor 410.

For example, if the image display device 100 disables setting a candidate item and senses the input of the direction key, the image display device 100 may move the cursor 410 in a direction corresponding to the input of the direction key by a preset distance other than by an item unit. If the image display device 100 senses an input of long pressing the direction key, the image display device 100 may control a moving speed of the cursor 410 to be faster.

Figure 8:
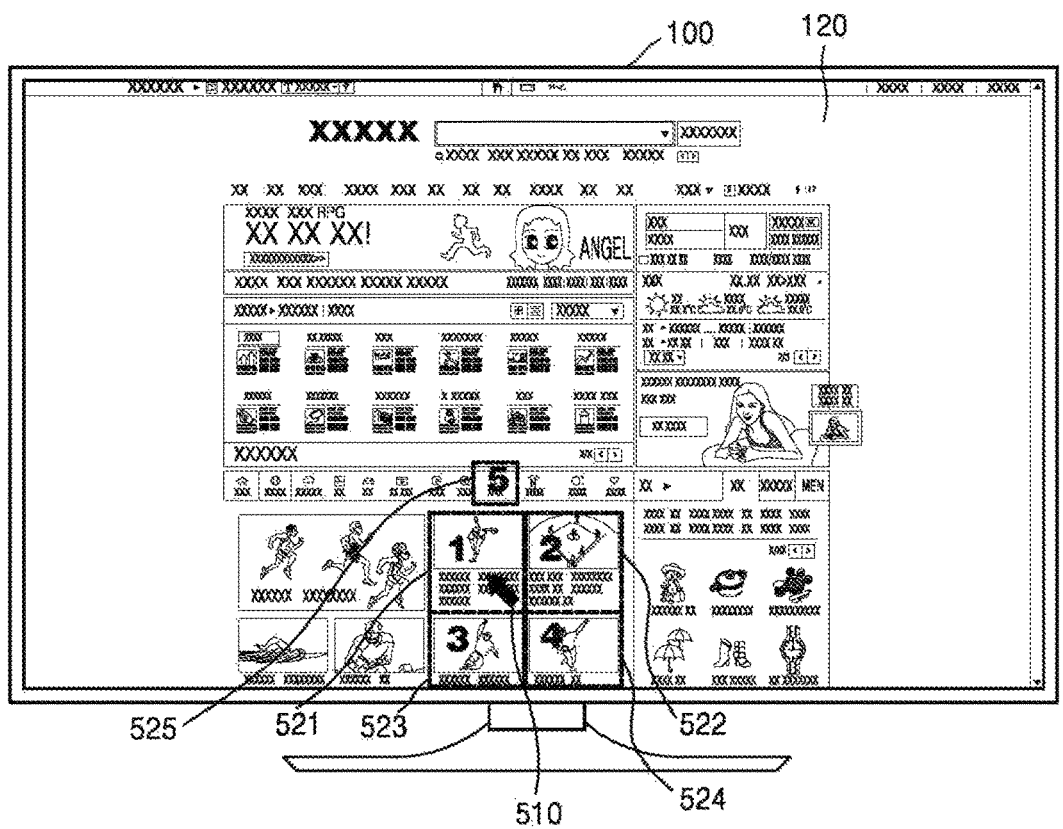
FIG. 8 is a diagram illustrating an example in which candidate items are displayed on a display according to an example embodiment.
Figure 8:
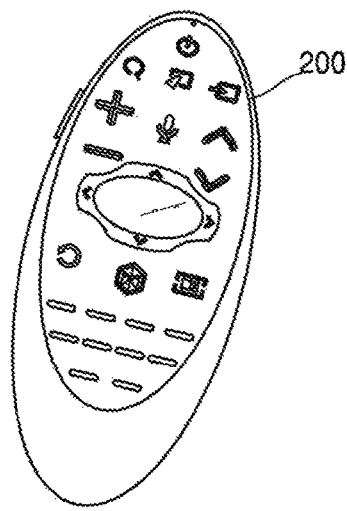

FIG. 8 is a diagram illustrating an example in which candidate items are displayed on the display 120 according to an example embodiment.

Referring to FIG. 8, the image display device 100 according to an embodiment may set items adjacent to a cursor 510 as candidate items if the cursor 510 stops moving.

The image display device 100 may set items located within a certain region with respect to a point where the cursor 510 stops moving as candidate items. For example, as illustrated in FIG. 8, the image display device 100 may set first through fifth candidate items 521, 522, 523, 524, and 525 adjacent to the cursor 510 as candidate items.

If candidate items are set according to an embodiment, a focus may be located on any one of the first through fifth candidate items 521, 522, 523, 524, and 525. For example, as illustrated in FIG. 8, the focus may be located on the first candidate item 521 located at the point where the cursor 510 stops moving.

The image display device 100 may also display guidelines on edges of the items 521, 522, 523, 524, and 525 set as the candidate items and may display a number on each of the candidate items 521, 522, 523, 524, and 525. For example, the image display device 100 may display the number '1' on the first candidate item 521 the number '2' on the second candidate item 522, the number '3' on the third candidate item 523, the number '4' on the fourth candidate item 524, and the number '5' on the fifth candidate item 525.

The image display device 100 may sense an input of selecting a number while numbers are displayed on the candidate items 521, 522, 523, 524, and 525. For example, the image display device 100 may sense an input of any one of the number keys included in the control device 200.

When the image display device 100 senses an input of a number key, the image display device 100 may move a focus to an item on which a corresponding number is displayed or may select the item on which the corresponding number is displayed. For example, when the image display device 100 senses an input of selecting a number '2' key among the number keys included in the control device 200, the image display device 100 may move the focus to the second candidate item 522 on which the number '2' is displayed. In this regard, if the focus moves, the cursor 510 displayed on the display 120 may also move to the second candidate item 522 on which the focus is located.

Alternatively, the image display device 100 may sense a number that is input to a touch pad included in the control device 200 and move the focus to an item on which the input number is displayed or select the item on which the input number is displayed. For example, the image display device 100 may sense an input of drawing the number '3' on the touch pad included in the control device 200 and move the focus to the third candidate item 523 on which the number '3' is displayed.

However, an input of a number is not limited to the embodiments described above. The image display device 100 may sense the input number in various ways.

When an input number is a number that is not displayed on a candidate item, the image display device 100 may release a setting of the candidate item. If the image display device 100 releases the setting of the candidate item, the image display device 100 may stop displaying guidelines and numbers on edges of candidate items. For example, as illustrated in FIG. 8, while the numbers '1' to '5' are displayed on the candidate items 521, 522, 523, 524, and 525, if the image display device 100 senses an input of selecting the number '6', the image display device 100 may release setting the candidate item.

Figure 9A:
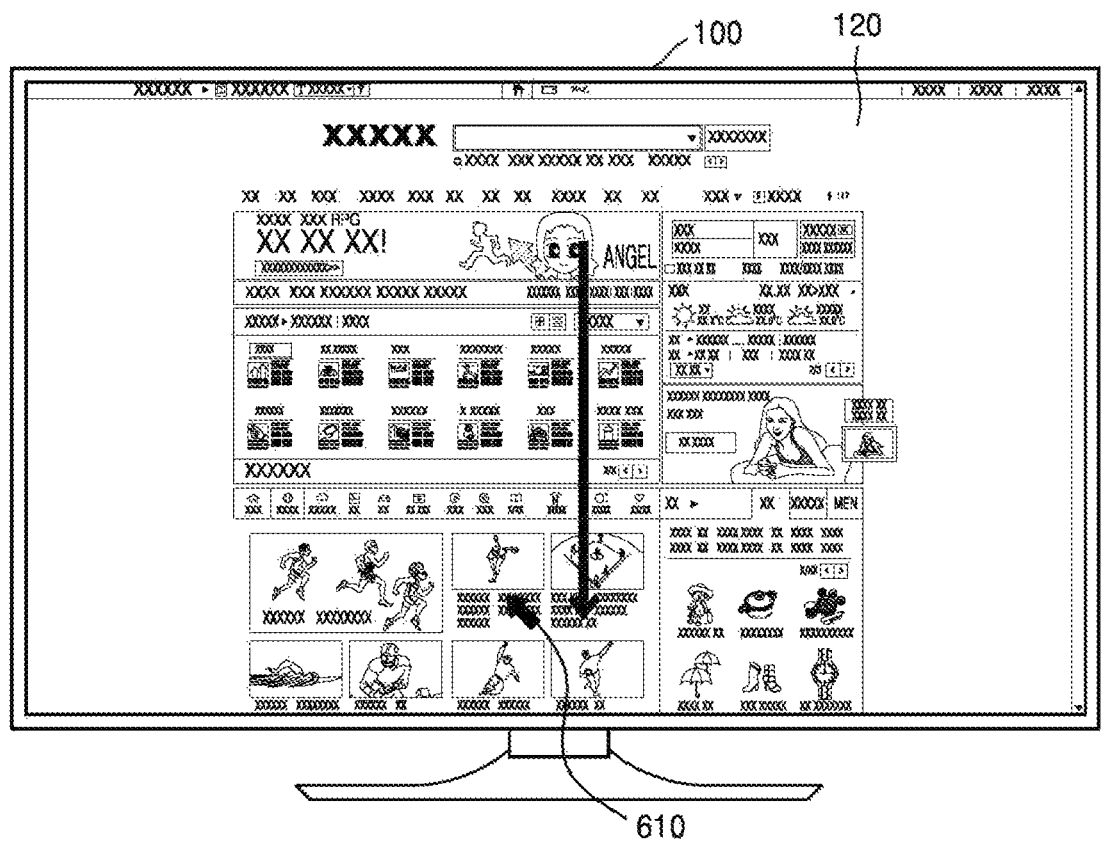
FIGS. 9A, 9B and 9C are diagrams illustrating examples in which candidate items are set and displayed on a display according to an example embodiment.
Figure 9A:
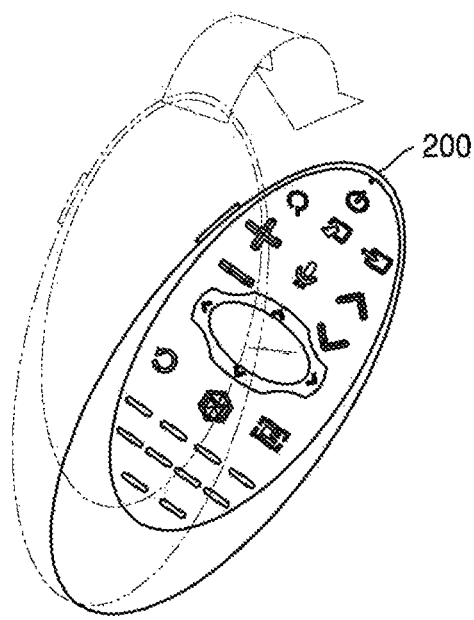
Figure 9B:
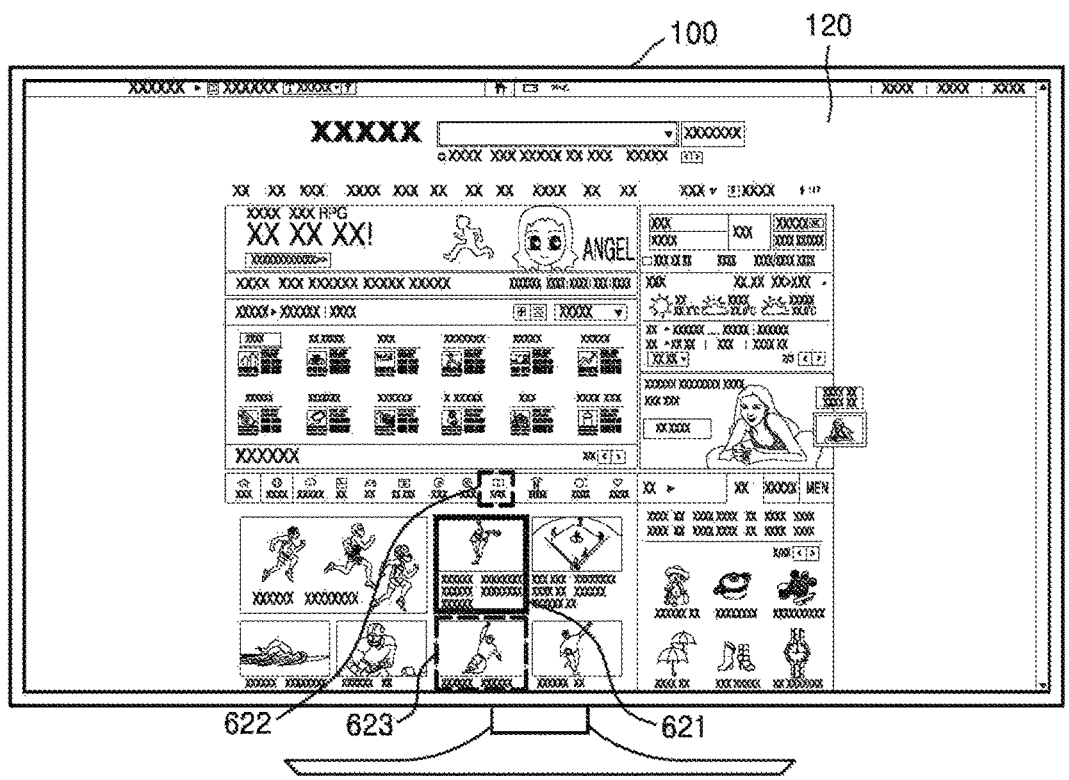
Figure 9B:
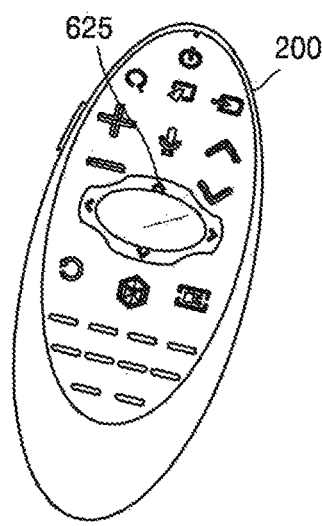
Figure 9C:
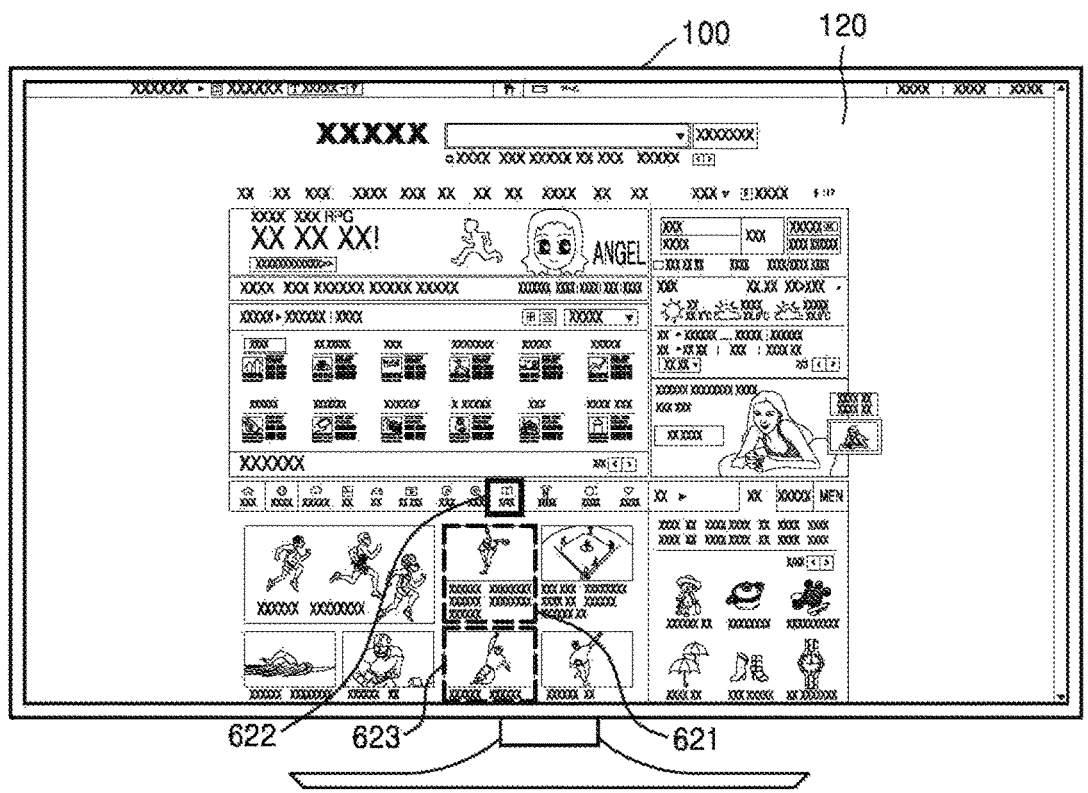
Figure 9C:
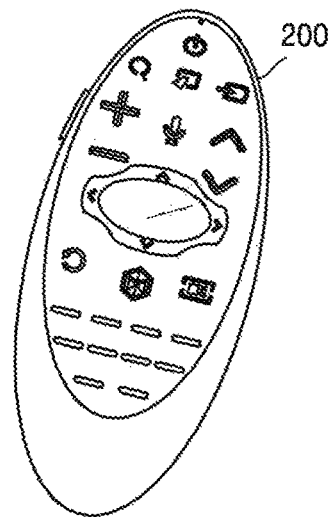

FIGS. 9A, 9B and 9C are diagrams illustrating examples in which candidate items are set and displayed on the display 120 according to an example embodiment.

Referring to FIG. 9A, the display 120 may display a plurality of items. For example, the display 120 may display a web page or a menu screen, etc. including the plurality of items. However, the present disclosure is not limited thereto.

As illustrated in FIG. 6A, the plurality of items may include an item indicating content and may be displayed as text or images.

Referring to FIG. 9A, the display 120 may display a cursor 610 indicating a location of a user input. The cursor 610 may move on the display 120 in accordance with the sensed user input.

A user may move the cursor 610 by using the control device 200.

The image display device 100 according to an embodiment may operate in a pointing mode when an input of touching a touch region of the control device 200 is sensed or a predetermined button of a user inputter of the control device 200 is pressed. When the image display device 100 operates in the pointing mode, the image display device 100 may receive a pointing signal from the control device 100 and move the cursor 610. The image display device 100 may sense a movement direction and degree of the control device 200 and move the cursor 610 on the display 120 according to the sensed movement.

Alternatively, when the control device 200 includes a touch pad, the image display device 100 may move the cursor 610 on the display 120 according to a displacement value of a subject such as a user's finger that is moving on the touch pad.

As illustrated in FIG. 9A, while the control device 200 operates in the pointing mode, if a user input of moving the control device 200 in a down direction or tilting the control device 200 is received, the image display device 100 may move the cursor 610 displayed on the display 120 in the down direction in accordance with the user input. In this regard, information regarding a sensed movement of the control device 200 may be transmitted to the image display device 100 through a sensor of the control device 200. The image display device 100 may calculate a coordinate of the cursor 610 from the information regarding the movement of the control device 200 and move the cursor 610 on the display 120 to the calculated coordinate.

Referring to FIG. 9B, if the cursor 610 stops moving, the image display device 100 according to an embodiment may set items adjacent to the cursor 610 as candidate items 621, 622, and 623. In this regard, the image display device 100 may determine that the cursor 610 stops moving when a movement amount of the control device 200 received from the control device 200 is reduced to less than a threshold value.

The image display device 100 may set items located in a certain region with respect to a point where the cursor 610 stops moving as candidate items. A method of setting candidate items is the same as described with reference to FIG. 6B, and thus a description thereof is omitted.

As illustrated in FIG. 9B, the image display device 100 may display guidelines on the set candidate items 621, 622, and 623. For example, the image display device 100 may display a guideline as a broken line on an edge of each of the candidate items 621, 622, and 623 in accordance with a shape of each of the candidate items 621, 622, and 623.

If the candidate items 621, 622, and 623 are set, the image display device 100 may place a focus on any one of the candidate items 621, 622, and 623 and highlight a candidate item on which the focus is placed without displaying a cursor. For example, as illustrated in FIG. 9B, the image display device 100 may display a bold line on an edge of the first candidate item 621 located at a point where the cursor stops moving, thereby highlighting the first candidate item 621. However, the present disclosure is not limited thereto.

The image display device 100 may sense an input of a direction key for moving the focus. For example, if the image display device 100 receives an input of an up direction key 625 among four direction keys, as illustrated in FIG. 9C, the image display device 100 may move the focus located on the first candidate item 621 to the second candidate item 622 most adjacent to the first candidate item 621 in an up direction. In this regard, the image display device 100 may display a guideline as a broken line in the edge of the first candidate item 621 and as a bold line in an edge of the second candidate item 622.

Figure 10A:
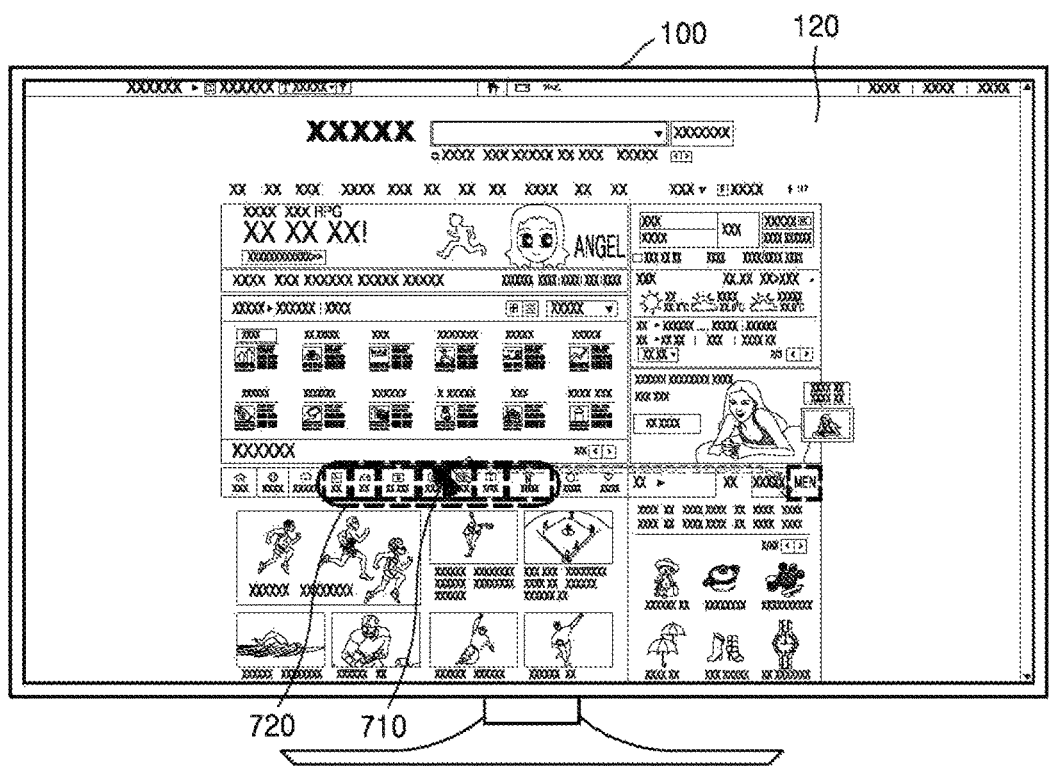
FIGS. 10A and 10B are diagrams illustrating an example method of setting candidate items, according to an example embodiment.
Figure 10A:
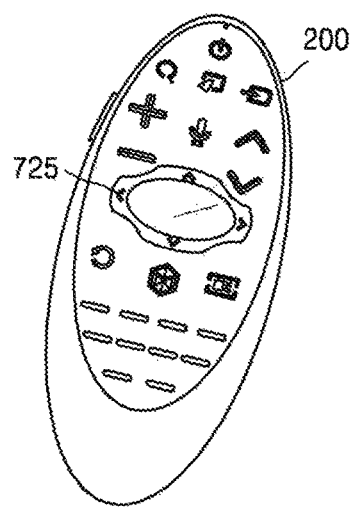
Figure 10B:
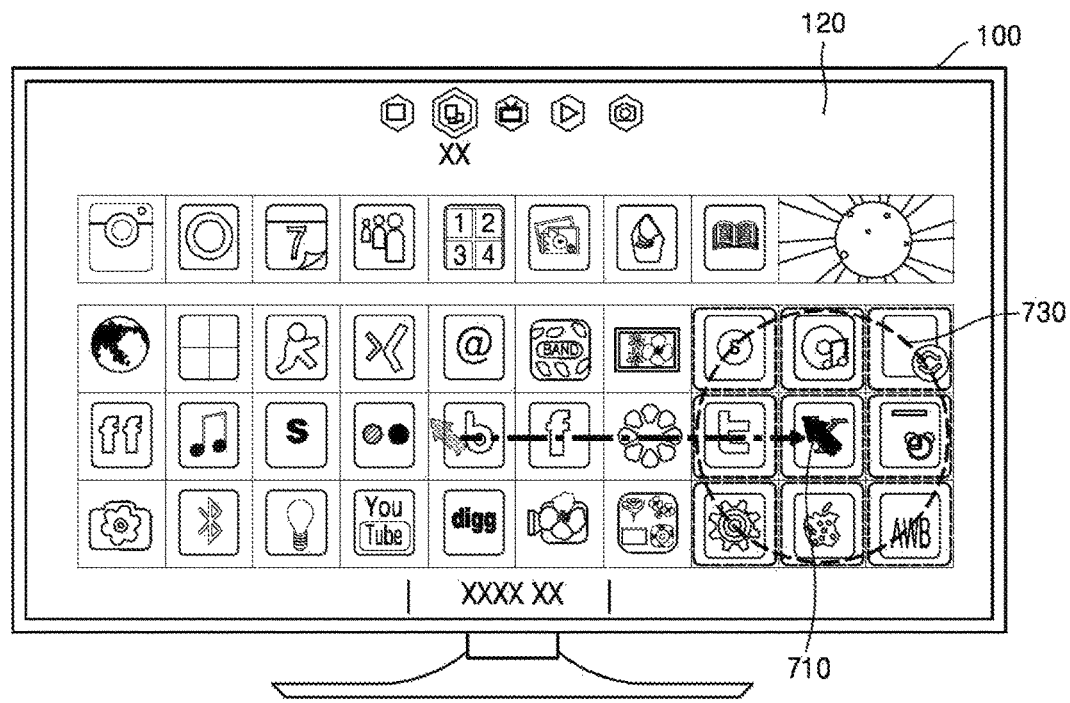
Figure 10B:
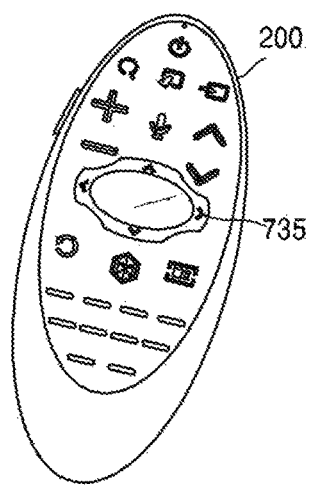

FIGS. 10A and 10B are diagrams illustrating an example method of setting candidate items, according to an example embodiment.

Referring to FIG. 10A, the display 120 may display a web page screen including a plurality of items. The display 120 may also display a cursor 710 indicating a location of a user input. The cursor 710 may move on the display 120 in accordance with a sensed user input.

For example, the image display device 100 may receive an input of at least one of four direction keys included in the control device 200 and move the cursor 710 in a direction corresponding to the received input of the direction key. Alternatively, when the control device 200 operates in a pointing mode, the image display device 100 may sense a movement direction and degree of the control device 200 and move the cursor 710 in accordance with a sensed movement. Alternatively, the image display device 100 may move the cursor 710 in accordance with a displacement value of a subject such as a user's finger that is moving on a touch pad included in the control device 200.

As illustrated in FIG. 10A, if the image display device 100 receives an input of a left direction key 725 (when a user presses the left direction key 725) among the four direction keys, the image display device 100 may move the cursor 710 displayed on the display 120 in a left direction. Alternatively, while the control device 200 operates in the pointing mode, if the control device 200 moves in the left direction or tilts, the image display device 100 may move the cursor 710 displayed on the display 120 in the left direction. Alternatively, when the image display device 100 receives an input of dragging a finger left on the touch pad included in the control device 200, the image display device 100 may move the cursor 710 in the left direction.

If the cursor 710 stops moving, the image display device 100 according to an embodiment may set items adjacent to the cursor 710 as candidate items. The image display device 100 may set items located in a certain region (a candidate item region 720) with respect to a point at which the cursor 710 stops moving as candidate items. In this regard, a size and a shape of the certain region may be determined based on sizes of adjacent items, a shape of arranged items, and a direction in which the cursor 710 moves.

For example, as illustrated in FIG. 10A, when the cursor 710 moves in a left direction on the same horizontal line and items adjacent to the cursor 710 are arranged in a line in a horizontal direction, the candidate item region 720 may be set as an oval region having a vertical line as a major axis and a horizontal line as a minor axis with respect to the point at which the cursor 710 stops moving. The greater the sizes of the items adjacent to the cursor 710, the greater the candidate item region 720. The smaller the sizes of the items adjacent to the cursor 710, the smaller the candidate item region 720.

The image display device 100 may set items located in the candidate item region 720 (the oval region) as candidate items.

Referring to FIG. 10B, the display 120 may display a menu screen including a plurality of items. The display 120 may also display the cursor 710 indicating a location of a user input. The cursor 710 may move on the display 120 in accordance with a sensed user input.

For example, as illustrated in FIG. 10B, if the image display device 100 receives an input of a right direction key 735 (when a user presses the right direction key 735) among the four direction keys, the image display device 100 may move the cursor 710 displayed on the display 120 in a right direction. Alternatively, while the control device 200 operates in the pointing mode, if the control device 200 moves in the right direction or tilts, the image display device 100 may move the cursor 710 displayed on the display 120 in the right direction. Alternatively, when the image display device 100 receives an input of dragging a finger right on the touch pad included in the control device 200, the image display device 100 may move the cursor 710 in the right direction.

If the cursor 710 stops moving, the image display device 100 according to an embodiment may a candidate item region 730 based on sizes of adjacent items, a shape of arranged items, and a direction in which the cursor 710 moves and set items included in the candidate item region as candidate items.

For example, as illustrated in FIG. 10B, when the cursor 710 moves in a right direction on the same horizontal line and items adjacent to the cursor 710 are arranged in a line in horizontal and vertical directions, the candidate item region 730 may be set as a circular region with respect to the point at which the cursor 710 stops moving. The greater the sizes of the items adjacent to the cursor 710, the greater the candidate item region 730 (the circular region). The smaller the sizes of the items adjacent to the cursor 710, the smaller the candidate item region 730 (the circular region).

The image display device 100 may set items located in the candidate item region 730 (the circular region) as candidate items.

Figure 11:
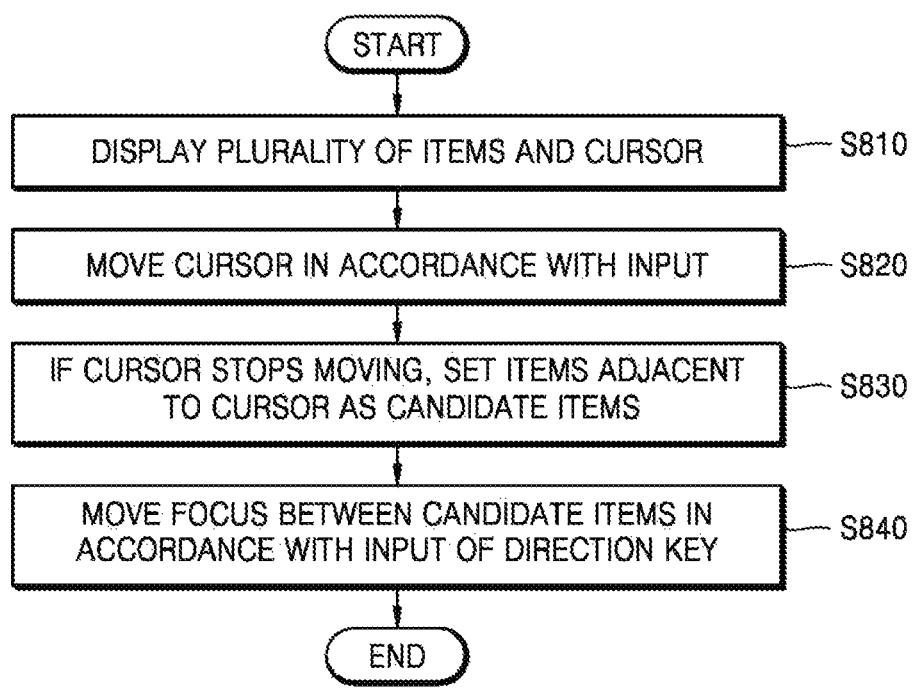
FIG. 11 is a flowchart illustrating an example image display method according to an example embodiment.

FIG. 11 is a flowchart illustrating an example image display method according to an example embodiment.

Referring to FIG. 11, the image display device 100 may display a plurality of items and a cursor (operation S810).

For example, the image display device 100 may display a web page or a menu screen including the plurality of items. However, the present disclosure is not limited thereto.

The image display device 100 may display the cursor indicating a location of a user input. The cursor may have various shapes and sizes that may be set based on a user input.

The image display device 100 may move the cursor in accordance with a received input (operation S820), such as, for example, a user input.

For example, the image display device 100 may receive an input of at least one of four direction keys included in the control device 200 and move the cursor in a direction corresponding to the received input of a direction key. In this regard, when the image display device 100 receives an input of long pressing the direction key or a repetitive input of a direction key in the same direction, the image display device 100 may control a moving speed of the cursor to be faster.

Alternatively, when the control device 200 operates in a pointing mode, the image display device 100 may sense a movement direction and degree of the control device 200 and move the cursor in accordance with a sensed movement. Alternatively, the image display device 100 may move the cursor in accordance with a displacement value of a subject such as a user's finger that is moving on a touch pad included in the control device 200.

If the cursor stops moving, the image display device 100 may set items adjacent to the cursor as candidate items (operation S830).

The image display device 100 may set items located in a certain region with respect to a point where the cursor stops moving as candidate items. In this regard, a size and a shape of the certain region may be determined based on sizes of adjacent items, a shape of arranged items, and a direction in which the cursor moves.

The image display device 100 may display guidelines on the set candidate items and place a focus on any one of the candidate items.

The image display device 100 may move the focus between the candidate items in accordance with an input of a direction key (operation S840).

For example, the image display device 100 may sense the input of the direction key for moving the focus and move the focus to a second candidate item most adjacent to a first candidate item on which the focus is currently located in a direction corresponding to the input of the direction key.

A method of operating an image display device according to an embodiment may be implemented as program instructions executable by a variety of computers and recorded on a computer readable medium. The computer-readable medium may also include a program instruction, a data file, a data structure, or combinations thereof. The program instructions recorded on the media may be designed and configured specially for the embodiments or be known and available to those skilled in computer software. Examples of the computer-readable medium include a magnetic medium, such as a hard disk, a floppy disk, and a magnetic tape, an optical medium, such as a CD-ROM, a DVD, etc., a magneto-optical medium such as a floptical disk, and a hardware device specially configured to store and perform program instructions, for example, ROM, RAM, flash memory, etc. Examples of the program instructions include machine codes made by, for example, a compiler, as well as high-level language codes executable by a computer, using an interpreter.

According to an example embodiment, a combination of a cursor movement method and a focus movement method is used, and thus accuracy of the selection of an item may increase. The item may be easily selected by a small number of inputs, and thus user convenience may be enhanced.

It should be understood that various example embodiments described herein should be considered in a descriptive sense only and not for purposes of limitation. Descriptions of features or aspects within each example embodiment should typically be considered as available for other similar features or aspects in other embodiments.

While one or more example embodiments have been described with reference to the figures, it will be understood by those of ordinary skill in the art that various changes in form and details may be made therein without departing from the spirit and scope as defined by the following claims.

What is claimed is:

1. An image display device comprising:
a display configured to display a plurality of items and a cursor indicating a pointing position determined by a received input;
input receiving circuitry configured to receive an input for moving the cursor; and
a controller configured to control the cursor to move relative to the displayed plurality of items in accordance with the received input, to determine items adjacent to the cursor as candidate items if the cursor stops moving, and to control to display a focus on a first candidate item among the candidate items and guidelines on the candidate items,
wherein in response to an input of a direction key while the focus is displayed on the first candidate item,
the controller is further configured to control the focus to move to a second candidate item among the candidate items corresponding to the input of the direction key if the input of the direction key corresponds to a short press and to control the cursor to move in a direction corresponding to the input of the direction key if the input of the direction key corresponds to a long press.

2. The image display device of claim 1, wherein the input for moving the cursor is the long press of the direction key, and wherein the controller is configured to control a moving speed of the cursor to be increased based on receiving the long press of the direction key.

3. The image display device of claim 1, wherein the controller is configured to set the candidate items based on a path in which the cursor moves.

4. The image display device of claim 3, wherein the controller is configured to control items adjacent to the cursor in a same direction as a direction in which the cursor moves, and in a different direction from a direction in which the cursor moves to be set as the candidate items.

5. The image display device of claim 1, wherein the display is configured to display the cursor on a candidate item on which the focus is located.

6. The image display device of claim 1, wherein, the controller is configured to control the focus to be located on a candidate item on which the cursor is located and to control the cursor to stop being displayed if the guidelines are displayed on the candidate items.

7. The image display device of claim 6, wherein the controller is configured to highlight the candidate item on which the focus is located.

8. The image display device of claim 1, wherein in response to the long press of the direction key, the controller is configured to control the cursor to move in a direction corresponding to the pressed direction key, and in response to a key release following the long press of the direction key, the controller is configured to stop the displaying the cursor and to display the focus and the guidelines.

9. The image display device of claim 1, wherein the controller is configured to stop the guidelines from being displayed when the input of the direction key is not sensed for a predetermined time period while the guidelines are displayed on the candidate items.

10. The image display device of claim 9, wherein the input receiving circuitry is configured to receive the input for moving the cursor if the guidelines stop being displayed, and wherein the controller is configure to move the cursor in accordance with the received input.

11. A method of operating an image display device, the method comprising:

displaying a plurality of items and a cursor indicating a pointing position determined by a user input on a display;

receiving the user input for moving the cursor;

moving the cursor relative to the displayed plurality of items in accordance with the user input, determining items adjacent to the cursor as candidate items if the cursor stops moving, and displaying a focus on a first candidate item among the candidate items and guidelines on the candidate items; and in response to an input of a direction key while the focus is displayed on the first candidate item, moving the focus to a second candidate item among the candidate items in a direction corresponding to the input of the direction key if the input of the direction key is corresponding to a short press and moving the cursor in a direction corresponding to the input of the direction key if the input of the direction key is corresponding to a long press.

12. The method of claim 11, wherein the input for moving the cursor is the long press of the direction key, and if the long press of the direction key is received, a moving speed of the cursor is set to be increased.

13. The method of claim 11, wherein the candidate items are set based on a path in which the cursor moves.

14. The method of claim 13, wherein the candidate items comprise items adjacent to the cursor in a same direction as a direction in which the cursor moves and in a different direction from a direction in which the cursor moves.

15. The method of claim 11, further comprising: displaying the cursor on a candidate item on which the focus is located.

16. The method of claim 11, further comprising: locating the focus on a candidate item on which the cursor is located and not displaying the cursor if the guidelines are displayed on the candidate items.

17. The method of claim 16, further comprising: highlighting the candidate item on which the focus is located.

18. The method of claim 11, wherein moving the cursor in the direction comprises, in response to the long press of the direction key, moving the cursor in a direction corresponding to the pressed direction key, and further comprising: in response to a key release following the long press of the direction key, stopping display of the cursor and displaying the focus and the guidelines.

19. The method of claim 11, further comprising: stopping display of the guidelines when the input of the direction key is not sensed for a predetermined time period while the guidelines are displayed on the candidate items.

20. The method of claim 19, further comprising: receiving the input for moving the cursor if the guidelines stop being displayed, and moving the cursor in accordance with the received input.

\* \* \* \* \*